United States Patent [19]

Grögler et al.

[11] Patent Number: 4,546,165

[45] Date of Patent: Oct. 8, 1985

[54] PROCESS FOR THE PRODUCTION OF STABILIZED POLYISOCYANATES OF RETARDED REACTIVITY AND THEIR USE IN THE PRODUCTION OF POLYURETHANES

[75] Inventors: Gerhard Grögler; Heinrich Hess, both of Leverkusen; Richard Kopp, Cologne, all of Fed. Rep. of Germany

[73] Assignee: Bayer Aktiengesellschaft, Leverkusen, Fed. Rep. of Germany

[21] Appl. No.: 694,566

[22] Filed: Jan. 24, 1985

[30] Foreign Application Priority Data

Feb. 2, 1984 [DE] Fed. Rep. of Germany ....... 3403500

[51] Int. Cl.$^4$ ............... C08G 18/08; C08G 18/18; C08G 18/72
[52] U.S. Cl. ............... 528/53; 252/188.31; 528/44; 528/54; 528/73; 521/137
[58] Field of Search .............. 252/188.31; 521/137; 528/44, 54, 53

[56] References Cited

U.S. PATENT DOCUMENTS

| | | | |
|---|---|---|---|
| 3,409,461 | 11/1968 | Mehlo et al. | 117/100 |
| 3,475,200 | 10/1969 | Kallert et al. | 528/271 |
| 3,860,565 | 1/1975 | Barber, Jr. | 260/77.5 |
| 3,963,680 | 6/1976 | O'Keefe et al. | 260/77.5 |
| 4,000,218 | 12/1976 | Critchfield et al. | 260/858 |
| 4,032,516 | 6/1977 | McGarr | 260/77.5 |
| 4,070,346 | 1/1978 | Schnoering et al. | 260/77.5 |
| 4,200,725 | 4/1980 | Gras et al. | 528/49 |
| 4,251,401 | 2/1981 | Reischl | 260/9 |
| 4,328,330 | 5/1982 | Wellner et al. | 528/45 |
| 4,359,541 | 11/1982 | Patton et al. | 521/137 |
| 4,400,497 | 8/1983 | Blum et al. | 528/45 |

FOREIGN PATENT DOCUMENTS

| | | |
|---|---|---|
| 2557407 | 6/1977 | Fed. Rep. of Germany . |
| 2946085 | 5/1981 | Fed. Rep. of Germany . |
| 1134285 | 11/1968 | United Kingdom . |

*Primary Examiner*—Herbert S. Cockeram
*Attorney, Agent, or Firm*—Gene Harsh; Joseph C. Gil

[57] ABSTRACT

The present invention relates to a process for the production of solid polyisocyanates of retarded reactivity stabilized by surface modification by reacting solid, finely divided polyisocyanates, and particularly dimeric tolylene diisocyanate, dimeric diphenylmethane diisocyanate and 3,3'-diisocyanato-4,4'-dimethyl-N,N'-diphenyl urea, with acyclic, mono- or bicyclic compounds having an amidine or guanidine structure and which do not contain any hydrogen atoms reactive to isocyanates at room temperature in a quantity of from 0.1 to 25 equivalent percent of "amidine" or "guanidine" per isocyanate equivalent. The reaction may be carried out directly in a liquid medium selected from the group consisting of active hydrogen compounds, plasticizers, water, and solvents to form a suspension of polyadduct-coated, stabilized polyisocyanates in the liquid medium.

50 Claims, No Drawings

PROCESS FOR THE PRODUCTION OF STABILIZED POLYISOCYANATES OF RETARDED REACTIVITY AND THEIR USE IN THE PRODUCTION OF POLYURETHANES

BACKGROUND OF THE INVENTION

Hitherto, very little literature has been published on the surface modification of polyisocyanates which are solid at room temperature.

German Auslegeschrift No. 25 57 407 describes a process in which a solution of a polyisocyanate in a low-boiling solvent is sprayed into a reaction zone with a gaseous di- and/or polyamine to form hollow beads of polyurethane polyurea through the reaction of the polyisocyanate with the amine and by evaporation of the solvent. The reaction is generally controlled in such a way that the isocyanate groups react off completely with the amine and any other NCO-reactive components added.

U.S. Pat. No. 4,070,346 describes the production of finely powdered particles ranging from 1 to 100 $\mu$m in diameter by introducing liquid or molten polyisocyanate or NCO-terminated prepolymer droplets into a vapor chamber with volatile di- or polyamines. The particles after rapid removal from the reactor still contain free isocyanate groups in their interior beneath the solid polyurea skin. Particles having a residual NCO-content of from about 50 to 60% in their interior can be produced according to this process. Mixtures of polyisocyanates or isocyanate-terminated prepolymers with polyols (for example 1,4-butane diol) may also be sprayed in the diamine atmosphere and reacted to form particles.

U.S. Pat. No. 3,409,461 describes the coating of polyisocyanates with a protective substance, preferably a polymer. To this end, the isocyanate is dispersed in a solution of the polymer in a low-boiling solvent which has very little dissolving effect on the isocyanate and the resulting solution is spray-dried. A finely ground (particle size 1 to 10 $\mu$m) naphthylene-1,5-diisocyanate is preferably spray-dried with a 1 to 2.5% solution of polystyrene, polyvinyl butylether, chlorinated rubber and the like in tetrachloromethane. Free-flowing powders having particle sizes from about 1 to 50 $\mu$m are obtained. These powders are suitable for improving the adhesion of polyester products (woven fabrics, fibers, films) to rubber elastomers. In this process for coating isocyanates with polymers from solution, considerable quantities of toxic solvents may have to be used and removed. One particular disadvantage of the process lies in the high percentage of coating material (from 9 to 91% by weight: 50% by weight in the Examples) in the total weight of the coated isocyanate. As a result of this, an excessive proportion of troublesome foreign substance would have to be introduced in the production of high-quality polyurethanes.

U.S. Pat. No. 3,963,680 describes a further development of the encapsulation process described in U.S. Pat. No. 3,860,565 in which hardenable isocyanate mixtures are produced by the microencapsulation of up to 50% by weight of liquid trimerization catalysts, which contain from 1 to 25% by weight (based on catalyst) of primary or secondary organic polyamines, to form polyurea capsule walls. The catalysts are only activated in the isocyanates at elevated temperatures through destruction of the capsule walls. Further literature is cited in U.S. Pat. No. 3 963,680, particular reference being made to the work by Gutcho entitled "Capsule Technology and Microencapsulation", Noyes Data Corporation, Park Ridge, N.J./USA (1972).

German Offenlegungsschrift No. 1,570,548 describes a relatively long-lasting one-component system consisting of a mixture of (i) 1 mole of a polyester, polyether or polythioether, (ii) at least 1.5 moles of a solid isocyanate containing uret dione groups and having a melting point of 100° C. or more, and (iii) at least 0.3 mole of a solid chain-extending agent containing OH— and/or NH$_2$-groups and having a melting point of 80° C. or more. At least 80% of the solid constituents of the mixture are required to have a particle size of 30 $\mu$m or less. The shelf life of this one-component system amounts to between a few days and a few weeks at room temperature, but only to a few hours at 50° C. One disadvantage of this known process lies in the fact that at least two of the three reactants have to be present in solid form to guarantee the requisite stability in storage. The effect of this is that the mixtures obtained generally have very high viscosities, and their viscosity continues to increase slowly because none of the compounds has been adequately modified in its reactivity. The reaction of diols at the surface of the solid diisocyanate particles, which is reflected in the steady increase in viscosity, takes place without control and too slowly in practice and does not sufficiently retard the reactivity of the polyisocyanates to the point where the system is self-stabilizing. In addition, when the mixture is hardened, inhomogeneities are inevitable in the fully heated product due to the high percentages of solid constituents. Processing of the highly viscous to solid mixtures is also more difficult because, in contrast to liquid mixtures, they first have to be brought into a formable condition either by increasing temperature or by applying pressure.

When high-melting polyisocyanates are mixed with relatively high molecular weight and low molecular weight polyols, a constant and relatively rapid further reaction takes place with a marked increase in viscosity. In other words, the surface reaction on the solid polyisocyanate particles does not form a coating around the polyisocyanate which is sufficient for retarding the reactivity.

British Pat. No. 1,134,285 describes a process for the production of dimeric diisocyanates in an aqueous reaction medium. According to this reference, dimeric diisocyanates produced in this way (for example dimeric tolylene diisocyanate), do not react with polyfunctional compounds containing reactive hydrogen atoms at room temperature, although mixtures with polyols, for example, can be thermally crosslinked to form polyurethanes. Stability may possibly be brought about by a slow surface reaction of isocyanates with water to form polyureas. According to this reference, primary or secondary diamines (for example, ethylene diamine) or polyamines (for example, triethylene tetramine) may also be used in the aqueous suspension of the dimeric diisocyanate, preferably in quantities of from 100 to 60% of the NCO-groups present. Crosslinking with dimeric diisocyanates produced in this way is generally brought about by splitting of the uret dione ring at high temperatures, for example in the range from 150° to 200° C.

Finally, German Auslegeschrift No. 3,112,054 (which corresponds to U.S. Pat. No. 4,400,497) describes a process for the production of storable, thermally hardening mixtures of polyisocyanate and polyol. In this case, the polyisocyanate is present in the form of solid particles in the polyol. The polyisocyanate particles are surface-deactivated to a level of from 0.5 to 20 equivalent percent of the total number of isocyanate groups present. Compounds containing reactive hydrogen atoms such as mono- or polyols, primary or secondary mono- or polyamines, and water are used for deactivation. The thermal crosslinking of these deactivated polyisocyanates, must be carried out at a relatively high temperature (165° C.) because the reaction in question is not catalyzed.

There are references in the literature to a number of "blocked" polyisocyanates where the NCO-groups are completely reacted with H-reactive blocking agents, for example caprolactam and malonic esters. The splitting temperatures are generally very high, for example 150° C. and higher. Amidines containing at least one isocyanate-reactive group (for example 2-phenyl imidazoline) have already been described as blocking agents (German Auslegeschriften Nos. 2,729,704 and 2,946,085). Although amidine-blocked polyisocyanates of this type show a slightly reduced splitting temperature (120° C. or more), the entire blocking agent always must be split off. The same applies to the use of amidines as catalysts in the reaction of differently (for example phenol-) blocked polyisocyanates with relatively high molecular weight polyamines to form polyurethane ureas. Both the phenol blocking agent and the catalyst remaining in the system have to be removed (cf European Pat. No. 39,834).

DESCRIPTION OF THE INVENTION

By contrast, it is now possible in accordance with the present invention by reacting solid, finely divided polyisocyanates with acylic, mono- or bicyclic amidines or guanidines, which do not contain any isocyanate-reactive hydrogen atoms, to produce solid polyisocyanates of surprisingly retarded reactivity. The surface coating formed from the mono- or polyaddition products of unresolved structure of isocyanates and amidine or guanidine compounds, is in a thin layer and with only very few of the NCO-groups being reacted off at the particle surface of the isocyanates.

By contrast, in the case of liquid polyisocyanates, in solution or in the melt, it is known from the prior art that amidines of the type in question have a direct and very strong accelerating effect upon NCO-reactions. It was totally unexpected that an addition reaction resulting in an unforeseeable, but very strong deactivation of the polyisocyanate would take place on solid polyisocyanate surfaces. In the coating reaction of isocyanates with mono- or polyols, primary or secondary amines or polyamines or water, which is described in DE-A No. 3,112,054, substantially thermostable polyurethanes or polyureas are formed on the surface of the isocyanates. However, reaction products of surprisingly retarded reactivity, which are stable as such and which are only split back into the starting components after an adequate increase in temperature, are formed by the process according to the invention from solid polyisocyanates and acyclic, mono- or bicyclic amidine or guanidine compounds which do not contain any isocyanate-reactive hydrogen atoms. The deactivated polyisocyanates according to the invention may form storable one-component systems with reaction components containing active hydrogen atoms (for example, polyols and/or polyamines) and only react with those reaction components above a "thickening temperature" which will be defined hereinafter. In most cases, the thickening temperature is considerably lower than the splitting or deblocking temperature of uret dione diisocyanates or blocked polyisocyanates. The reaction may also be initiated by the addition of solvents to dissolve the polyadduct barrier layer at room or elevated temperatures.

The amidine or guanidine compounds which are in turn released during the thermal resplitting reaction may then serve as catalysts for the further reactions and accelerate the reaction or initiate other reactions, for example splitting of the uret dione ring (see also the Examples).

In addition, it is possible where the polyisocyanates are used in excess to carry out additional allophanate, biuret, or trimerization reactions (amidine-catalyzed). Another advantage of the process according to the invention lies in the fact that, where uret dione diisocyanates are used, rapid splitting of the uret dione ring also takes place under the effect of the amidines released. High-melting, sparingly soluble uret dione diisocyanates change in a single process step into partly liquid or readily soluble isocyanates which undergo polyaddition as such and, by comparison with the solid uret dione diisocyanates, give end products of different appearance. In addition, three or four NCO-groups may thus react from one mole of dimeric diisocyanate.

Many of the acyclic, mono- or bicyclic amidines or guanidines used in accordance with the invention have been described in the patent literature as extremely effective catalysts for polyisocyanate polyaddition reactions (cf. for example German Offenlegungsschriften Nos. 1,745,418, 2,722,514, 2,351,844, 2,439,550, 2,440,271, 2,737,670, 3,049,131, 2,946,085, 3,004,902 and 3,004,903 and European Pat. No. 39,834). Surprisingly, however, the catalytic activity of the amidine or guanidine compounds frequently mentioned in the patent literature could not be observed when solid polyisocyanates are used, for example, in suspension in polyols or in relatively high molecular weight aromatic polyamines and the temperature of the suspensions containing solid polyisocyanates is relatively low, for example below 60° C. and preferably between room temperature and approximately 50° C., i.e. below the "thickening temperature". Instead, it was found that, under these conditions, the isocyanate polyaddition reaction between NCO- and OH- or $NH_2$-groups is deactivated to a considerable extent. It was also found that, surprisingly, the reactivity of the solid polyisocyanates to compounds containing active hydrogen atoms is lower, the larger the quantity of amidine present in the reaction mixture (cf. Examples). This cannot in any way be expected to be the case where amidines are used as catalysts. This deactivation of the solid polyisocyanates by amidines is so pronounced that even the reaction of isocyanates with aromatically bound amino groups, which is known to take place rapidly at room temperature, is completely suppressed at room temperature. It is only after a certain temperature (the so-called thickening point) has been reached that a reaction takes place to form the polyureas. It is only above that thickening temperature that the components react off rapidly, accelerated to a considerable extent by the presence of the catalysts now released, to form the polyurethane (urea). The observations according to the invention are surprising, were not in any way apparent from the published literature and could not be foreseen by the expert.

All that is known from the existing literature is that bicyclic amidines which do not contain any reactive hydrogen atoms are able to enter into ring-closing reactions with monoisocyanates. After this addition reaction, heterocyclic compounds showing pharmacological activity are obtained. The following addition reaction:

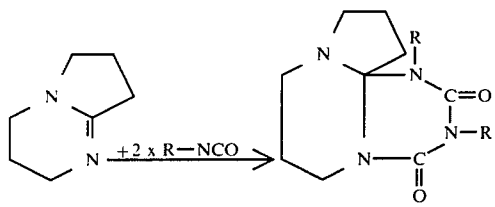

was reported, for example, in Indian J. Chem. Sect. B 14 (1976), 10, Pages 763 to 765. Similar reactions were also reported in Helv. Chim. Acta 56 (1973) 2, Pages 776 to 794.

The addition reactions in question were only carried out with monoisocyanates. Whether aromatic, solid polyisocyanates would react similarly with the amidines mentioned is not apparent from the existing literature. There is also no information in the existing literature on the thermal stability or resplitting of the addition compounds into the starting components and the subsequent further reaction of both components. In order to be able to give any explanation at all of the observations according to the invention, it could possibly be assumed that addition reactions of the type in question take place on the surface of the isocyanate particles.

Accordingly, the present invention relates to processes for the production of solid polyisocyanates of retarded reactivity which have been stabilized by surface modification, characterized in that solid, finely divided polyisocyanates (particle size 0.5 to 200 μm and preferably from 1 to 50 μm) having melting points above 30° C. and preferably above 80° C., are reacted with acyclic, monocyclic or bicyclic compounds which contain the amidine group and/or the guanidine group

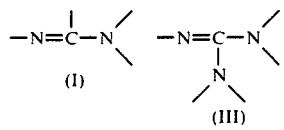

one or more times and which do not contain any hydrogen atoms reactive to isocyanates at room temperature, as stabilizers in a quantity of from 0.1 to 25 equivalent percent of amidine/guanidine groups per NCO equivalent, preferably in a quantity of from 0.1 to 12.5 equivalent percent and, most preferably, in a quantity of from 0.3 to 8 equivalent percent, in a liquid medium selected from the group consisting of (i) low molecular weight and/or relatively high molecular weight mono- and/or polyols, (ii) low molecular weight and/or relatively high molecular weight aromatic polyamines, (iii) relatively high molecular weight aliphatic polyamines, (iv) plasticizers, (v) water, (vi) apolar or weakly polar solvents (preferably based on aliphatic, cycloaliphatic or aromatic hydrocarbons, halogenated hydrocarbons, ethers, ketones or esters) and (vii) mixtures thereof. It is preferred to use as the liquid medium relatively high molecular weight polyols and/or relatively high molecular weight aromatic polyamines having molecular weights of from 400 to 6000, optionally in combination with low molecular weight polyols, preferably di- and triols, and/or low molecular weight aromatic polyamines, preferably, diamines. The components are reacted at temperatures below the melting temperature of the polyisocyanates, preferably at a temperature of up to about 70° C. and, more preferably, at a temperature of from 0° to 50° C., to form a suspension of polyadduct-coated, stabilized polyisocyanates in the liquid medium. The stabilized polyisocyanates may, if desired, be isolated from mono-alcohols, placticizers, water and/or solvents and, may be subsequently suspended in polyols and/or polyamines.

The acyclic, mono- or bicyclic amidine or guanidine compounds will be referred to in short hereinafter as "amidine/guanidine compounds" or as "compounds containing amidine/guanidine groups" or, quite briefly, as "amidine/guanidine stabilizers".

In one modification of the process according to the invention, up to 50 equivalent percent per amidine/guanidine equivalent of the amidine/guanidine stabilizers may be replaced by "amine" stabilizers, for example of the type mentioned in DE-A No. 3,112,054, i.e., preferably aliphatic or cycloaliphatic, low molecular weight diamines, and also relatively high molecular weight, aliphatic di- and polyamines; and also by hydrazine, alkyl hydrazine or dihydrazide compounds in accordance with Applicants' as yet unpublished U.S. application Ser. No. 514,410, filed on July 18, 1983.

More preferably, the present invention relates to processes for the production of polyisocyanates stabilized by surface modification based on the procedures already described, characterized in that the solid polyisocyanates are reacted with the amidine/guanidine stabilizers in the quantities indicated in a liquid medium of relatively high molecular weight aromatic polyamines having molecular weights of from 400 to 6000, optionally in combination with (i) low molecular weight aromatic polyamines, (ii) low molecular weight and/or relatively high molecular weight polyols, (iii) plasticizers, (iv) water, (v) apolar or slightly polar solvents or (vi) mixtures of (i) through (v) at temperatures below the melting temperatures of the polyisocyanates to form a suspension of polyadduct-coated, stabilized polyisocyanates in the relatively high molecular weight polyamines. The stabilized polyisocyanates may be isolated where the stabilizing reaction has only been carried out in plasticizers, water and/or weakly polar solvents and subsequently suspended in the relatively high molecular weight polyamines.

Preferred is the process in which the polyisocyanates are directly reacted with the amidines or guanidines in (i) relatively high molecular weight aromatic polyamines, (ii) relatively high molecular weight polyols (both (i) and (ii) having molecular weights of from 400 to 6000) optionally in combination with low molecular weight aromatic polyamines and/or low molecular weight polyols as chain-extending agents (both low molecular weight materials having molecular weights of from 60 to 399), to form the suspensions. The components are preferably reacted in quantities which correspond to a formulation of one-component polyurethane systems.

The present invention also relates to surface-modified, stabilized, solid, finely divided polyisocyanates of retarded reactivity produced by the process according to the invention, which may be suspended in storable form and which have a residual isocyanate group content of at least 75%, preferably at least 92% and, most preferably at least 97%, and containing less than 99.9% and preferably less than 99.7% of the NCO-groups originally present in the solid starting polyisocyanates and having a thickening temperature of the suspension of greater than 60° C., preferably from 80° to 140° C. and, most preferably, from 90° to 135° C.

The medium preferably used for suspension is a medium of relatively high molecular weight polyols and/or relatively high molecular weight aromatic and/or aliphatic polyamines having molecular weights of from 400 to 6000, optionally in combination with low molecular weight polyols and/or aromatic polyamines having molecular weights of from 60 to 399.

Particularly preferred are the polyadduct-coated polyisocyanates suspended in relatively high molecular weight aromatic and/or aliphatic polyamines having molecular weights of from 400 to 6000 and preferably from 400 to 3000, optionally in combination with low molecular weight polyols (preferably diols and triols) and/or aromatic polyamines (preferably diamines), having a molecular weight of from 62 to 399 and, optionally, small quantities, based on the relatively high molecular weight polyamines, of relatively high molecular weight polyols.

Preferred also are surface-modified, stabilized solid polyisocyanates using aliphatic or cycloaliphatic amidine or guanidine compounds as amidine/guanidine stabilizer suspended in relatively high molecular weight polyols having molecular weights of from 400 to 6000 in combination with low molecular weight aromatic diamines and, optionally, low molecular weight polyols having molecular weights of up to 399.

The amidines used in accordance with the invention are acyclic or cyclic amidines, preferably corresponding to formulae (III) to (VII) below:

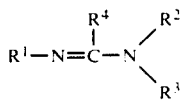
(III)

in which $R^1$ and $R^4$ may be the same or different and represent H, a straight-chain or branched aliphatic hydrocarbon radical containing from 1 to 18 C-atoms (preferably from 1 to 4 C-atoms), a cycloaliphatic hydrocarbon radical containing from 5 to 7 ring C-atoms, an araliphatic radical or an aromatic radical, preferably with 6–13 carbon atoms, which radicals may contain substituents inert under the reaction conditions and/or are interrupted by the structural units —O—, —S—, —N-alkyl or —N-cycloaklyl (alkyl and cycloalkyl as defined above); $R^2$ and $R^3$ may be the same as or different from $R^1$ or represent alkylene-N-(di-cycloalkyl) or alkylene-N-(dialkyl) radicals (alkyl- and cycloalkyl as defined above), [preferably —(CH$_2$)$_n$—N-(C$_1$-C$_6$-alkyl)$_2$-radicals, n=2–12], but not H. The amidines are preferably mono- or bicyclic amidines in which two of the radicals $R^1$ to $R^4$ are attached to one another to form a ring. Alternatively, several amidine radicals may be attached by polyfunctional radicals. It is noted that when $R^1$ is hydrogen, that hydrogen will not normally react with an isocyanate group at room temperature.

Preferred cyclic amidines include those corresponding to formula (IV)

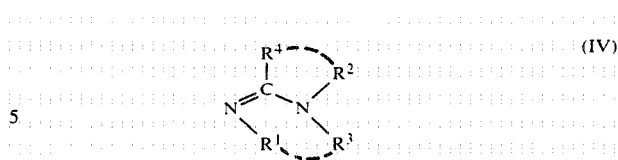

where the radicals $R^1$ and $R^3$ together and/or the radicals $R^2$ and $R^4$ together represent a straight-chain or branched alkylene radical with 2 to 5 C-atoms in the alkylene chain and optionally containing heteroatom (group)s such as —O—, —S— or —N-C$_1$-C$_4$-alkyl-groups. Preferably, the radicals represent —(CH$_2$)$_2$— or —(CH$_2$)$_3$—.

Also preferred are cyclic amidines of the formula V:

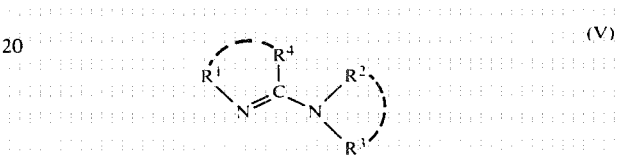

where $R^1$ and $R^4$ and/or $R^2$ and $R^3$ together represent an optionally branched alkylene radical with 2 to 5 C-atoms in the alkylene chain and optionally contain heteroatoms. Preferably the radicals represent —(CH$_2$)$_2$— and —(CH$_2$)$_3$—.

Also preferred are cyclic amidines corresponding to formula (VI):

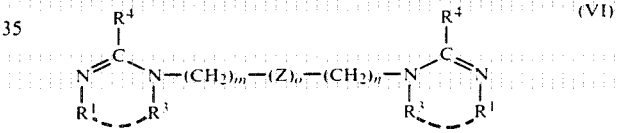

in which
$R^1$ and $R^3$ are as defined for formula IV;
$R^4$ is as defined for formula III,
Z is an N-C$_1$-C$_{18}$-alkyl group or a straight-chain or branched-chain C$_2$-C$_{14}$-alkylene radical which may optionally be interrupted in the chain by —O—, a cycloalkane radical containing from 5 to 8 ring members or a dicyclohexyl-(C$_1$-C$_4$-alkane)-radical;
m and n may be the same or different and represent integers of from 2 to 10, preferably 2 or 3 and o=zero or 1.

Other particularly preferred amidines are those corresponding to the following formula

in which
p=2, 3 or 4,
$R^4$ represents a straight-chain or branched C$_1$-C$_4$-alkyl radical (for example methyl, ethyl, isopropyl or tert.-butyl) and, $R^2$ represents a straight-chain or branched C$_1$-C$_4$-alkyl, —(CH$_2$)$_p$—N—(R$^4$)$_2$ or C$_5$-C$_7$-cycloalkyl radical.

The following are specific examples of acyclic amidines corresponding to formula (III): N,N-dimethyl formamidine, N,N-dimethyl acetamidine, N,N-diethyl formamidine, N,N,N'-trimethyl acetamidine, N,N-dimethyl-N'-benzyl acetamidine, N,N-dicyclohexyl-N'-methyl acetamidine, N,N-dimethyl-N'-cyclohexyl formamidine, N,N-dimethyl-N'-tert.-butyl formamidine.

The following are specific examples of the particularly preferred monocyclic amidines corresponding to formula (IV): 1,2-dimethyl-Δ2-imidazoline, 1-methyl-2-phenyl-Δ2-imidazoline, 1(N)-methyl-Δ2-imidazoline, 2-benzylimino-N-methyl caprolactam, 2-butylimino-N-methylbutyro-lactam, 1,8-diazabicyclo[5,3,0]-dec-7-ene, 1,8-diazabicyclo[5,4,0]-undec-7-ene, 1,7-diazabicyclo[4,4,0]-dec-6-ene, 1,6-diazabicyclo[3,4,0]-non-5-ene, 1,5-diazabicyclo[4,3,0]-non-5-ene, 1,14-diazabicyclo[11,4,0]-heptadec-13-ene, 1-(N)-methyl-Δ2-tetrahydropyrimidine, 1-cyclohexyl-2-methyl-Δ2-tetrahydropyrimidine, 1-cyclohexyl-Δ2-tetrahydropyrimidine, 1-benzyl-2-butyl-Δ2-tetrahydropyrimidine, 1-methyl-2-methyl-Δ2-tetrahydropyrimidine, 1-butyl-2-methyl-Δ2-tetrahydropyrimidine, 1-(2-ethylhexyl)-2-methyl-Δ2-tetrahydropyrimidine, 1-dodecyl-2-methyl-Δ2-tetrahydropyrimidine, 1-(1-methylcyclohexyl)-2-methyl-2-tetrahydropyrimidine, 1-(2-methylhexyl)-2-methyl-2-tetrahydropyrimidine, 1-(3,3,5-trimethylcyclohexyl)-2-methyl-Δ2-tetrahydropyrimidine.

Compounds such as these may be synthesized in particular in accordance with German Auslegeschrift No. 2,439,550.

Especially preferred amidines are those corresponding to the following formula

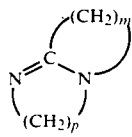

in which
m = 2, 3, 4, 5 or 11 and
n = 2, 3, or 4.

The production of a number of such compounds is described, for example, in German Pat. No. 1,545,855.

Examples of compounds corresponding to formula IV containing a lateral dialkylaminoalkyl group $R^2$ include 1-(3-N,N-dimethylaminopropyl)-2-methyl-Δ2-tetrahydropyrimidine and, 1-(2-N,N-dimethylaminoethyl)-2-methyl-Δ2-tetrahydropyrimidine, being produced in accordance with German Auslegeschrift No. 3,049,131.

Examples of the amidines corresponding to formula (V) include 1-methyl-4-(2-tetrahydroazepinyl)-piperazine

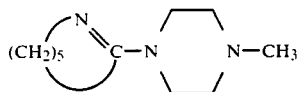

phenyl-methyl-(2-tetrahydroazepinyl)-amine

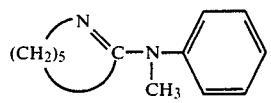

-continued benzyl-methyl-(2-tetrahydroazepinyl)-amine

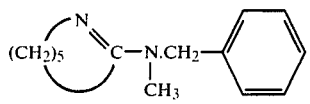

and 4-(2-tetrahydroazepinyl)-morpholine

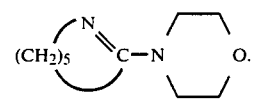

The acyclic amidines or the cyclic or bicyclic amidines formed by the attachment of two radicals are described in German Auslegeschrift No. 2,722,514.

General information on the synthesis of amidines can be found in Houben-Weyl, Methoden der Organischen Chemie, Vol. XI, 2, Pages 38 to 66; Verlag G. Thiem, Stuttgart 1958.

Compounds corresponding to formula (VI) include, for example

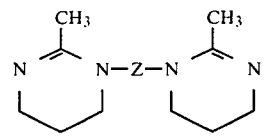

in which
Z represents —(CH$_2$)$_2$—, —(CH$_2$)$_6$—,

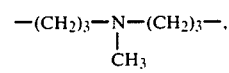

—(CH$_2$)$_6$—NH—CO—O—(CH$_2$)$_3$—O—(CH$_2$)$_3$—O—CO—NH(CH$_2$)$_6$— or —(CH$_2$)$_2$—O—(CH$_2$)$_2$—.

These compounds are obtained by the methods described in German Auslegeschrift No. 3,049,131.

Guanidines used in accordance with the invention preferably correspond to formula (VIII) and include acyclic or cyclic guanidines, but also di- and triguanides and compounds which may repeatedly contain the guanidine radical. The preferred guanidines correspond to formula VIII:

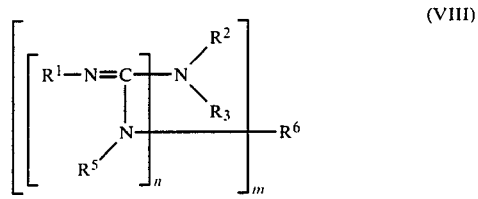

wherein
m = 1 or 2,
n = 1, 2, or 3 when m = 1, preferably n = 1; and n = 1 when m = 2
$R^1$, $R^2$ and $R^3$ represent radicals of the type defined in reference to the amidines corresponding to formula (III),
$R^5$ has the same meaning as $R^2$, R[6] represents either a monofunctional radical of the type mentioned for R[2] or a difunctional $C_2$–$C_{12}$-alkylene radical which may optionally be interrupted by —O—, —N($C_1$–$C_4$-alkyl)— or —N($C_5$–$C_7$-cycloalkyl)-radicals. When n=1, any group of two of the radicals R[1], R[2], R[3], R[5] and R[6] may be attached to one another to form a ring. Preferred cyclic guanidines correspond to the following formulae:

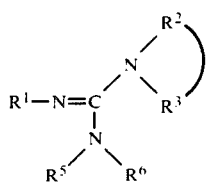
(VIII-a)

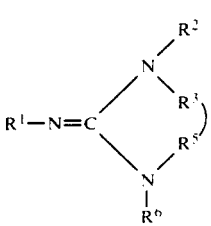
(VIII-b)

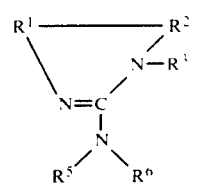
(VIII-c)

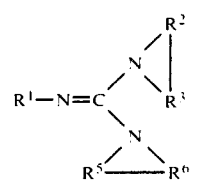
(VIII-d)

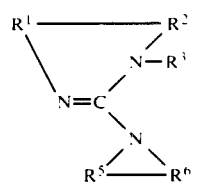
(VIII-e)

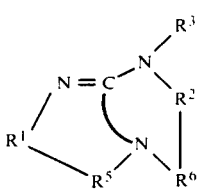
(VIII-f)

In formulae (VIII-a) to (VIII-f), the groups formed by the attachment of two of the R's to form the rings preferably are alkylene groups of from 2 to 5 carbon atoms and may optionally be interrupted by heteroatoms (—O—, —S—, -N(alkyl)-) or substituted by substituents inert during the reaction (for example halogen, alkyl).

Other suitable guanidines are shown in the following schedule. It is pointed out that the guanidines in which R[1] is hydrogen normally do not react with isocyanates at room temperature on that (HN—) group.

| Substituents on the nitrogen | Substituted x-times | in the following primary guanidine structures |
|---|---|---|
| methyl-, ethyl-, (iso)propyl-, (iso)butyl-, (tert.)-butyl-, (iso)pentyl-, hexyl-, 2-ethylhexyl-, | tetra | \N—C(=NH)—N/ |
| octyl-, dodecyl-, stearyl-, ethoxypropyl-, butoxyhexyl-, cyanoethyl-, cyanohexyl-, butoxycarbonyl-methyl-, | penta | \N—C(—N\)—N/ |
| methoxycarbonylmethyl-, dimethylaminopropyl-, cyclopentyl-, cyclohexyl-, (chloro)benzyl-, phenethyl-, phenyl-, tolyl-, | tri- | (5-ring) N=C—N\ |
| methoxyphenyl-, ethoxycarbonylphenyl-, | tri- | (6-ring) N=C—N\ |
| | tri | (CH₂)₅ ring N=C—N\ |
| | mono- | (bicyclic) N=C—N— |
| | mono- | (bicyclic) N=C—N— |
| | mono- | (bicyclic) N=C—N— |

Further examples are iminocarbonic-acid-bis-(sec.)-amides having the following composition:

| | | |
|---|---|---|
| methylimino-<br>ethylimino-<br>cyanoethylimino-<br>dibutylaminobutylimino-<br>hexylimino-<br>stearylimino-<br>cyclohexylimino-<br>benzylimino-<br>phenylimino-<br>p-chlorobenzylimino-<br>4-methyl-benzylimino- | carbonic acid | -bis-morpholide<br>-bis-piperidide<br>-bis-N'—methyl-piperazide |

Particularly suitable cyclic guanidine compounds correspond to the following formulae:

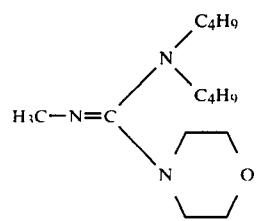
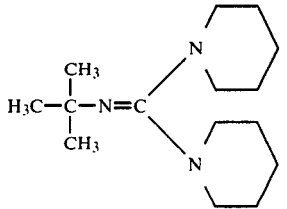
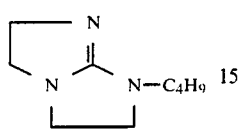
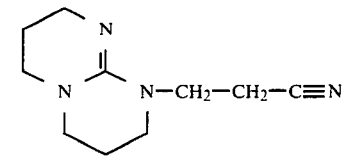
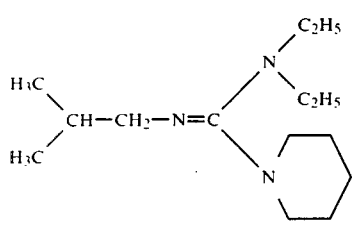
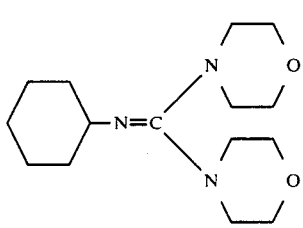
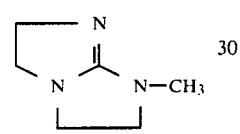
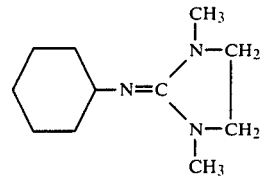
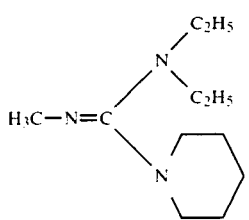
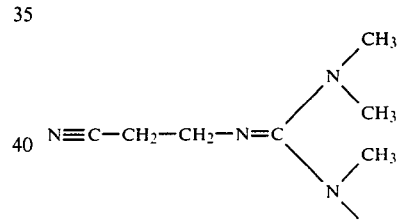
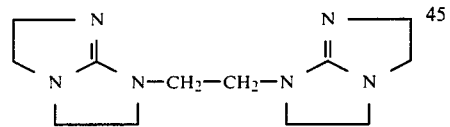
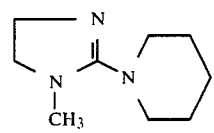
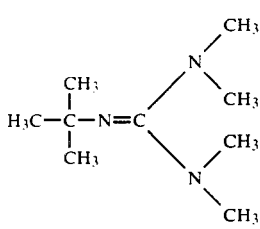
Particularly preferred are tetramethyl guanidine, pentamethyl guanidine and cyclic guanidine compounds of the following formula:
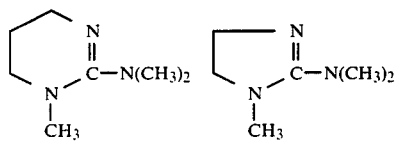
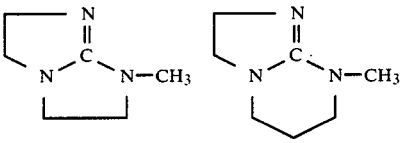

Instead of using the free amidine/guanidine compounds, it is also possible, although less preferred, to use acid addition salts of the amidines or guanidines. In the context of the invention, such salts are distinctly active in the production of polyurethane ureas in the combination of the surface-modified polyisocyanates with aminopolyethers as the suspension medium. However, this stabilizing effect is considerably weaker where production is carried out in combinations of polyether polyols, low molecular weight aromatic diamines or surface-modified polyisocyanates. The catalytic activity of the amidine-salt polyurethane reactive systems is also distinctly less pronounced in thermal crosslinking. In cases such as these, additional catalysts, such as organometallic tin salts or tertiary amines (cf. Examples), are required for completely reacting the solid polyisocyanates in the polyether polyols. Accordingly, the use of the salts for stabilizing solid polyisocyanates is less preferred. The expression "acid addition salts" is intended to include salts formed with acids and also salts formed with other proton donor compounds. Typical acids for producing these salts include monocarboxylic acids, such as formic acid, acetic acid, propionic acid, butyric acid, caproic acid, valeric acid, octylic acid, lauric acid, stearic acid, oleic acid; dicarboxylic acids, such as oxalic acid, malonic acid, succinic acid, fumaric acid, adipic acid; hydroxylic acids, such as glycolic acid, lactic acid, tartaric acid and the like; sulfonic acids, such as alkyl or aryl sulfonic acids, sulfamic acid, sulfanilic acid; inorganic acids, such as carbonic acid, phosphoric acid, hydrochloric, sulfuric acid and the like and other proton donor compounds, such as sulfonamides; phenols, such as phenol, cresol or thiophenols; enols, such as barbituric acid, uric acid and the like. Fatty acids containing at least two carbon atoms and phenols are particularly preferred.

Where acyclic, mono- or bicyclic amidines or guanidines are used for deactivating the solid polyisocyanates in accordance with the invention, an increase—in some cases a considerable increase—in the surface stabilizing effect is observed when small quantities of water, low molecular weight glycols or amines are added to the reaction mixture (cf. Examples). The advantage of this operation lies in the fact that, even where the amidines/guanidines are used in small quantities, the required stability of the mixture in storage can be obtained. Furthermore, the catalytic effect upon the further NCO-reactions which is exerted by the amidine/guanidine during thermal crosslinking can be reduced. In certain cases this is desirable (for example, reduced splitting of the uret dione ring in the case of dimeric TDI, so that the rigid uret dione segment is retained in the polyurethane, or even reduced by uretization where tolylene diisocyanate-urea diisocyanate is used).

The amidines or guanidines used for deactivation stabilize the isocyanates to a considerable extent at room temperature, even with respect to aromatically or aliphatically bound $NH_2$-groups (for example in relatively high molecular weight aliphatic polyamines). Such stabilizers then fully develop their catalytic activity above the thickening temperature during the thermal crosslinking step. Thus, there is generally no need for other catalysts of the type which would be required for the rapid solidification of slowly reacting active hydrogen compounds (for example with secondary OH terminal groups or even with water). In addition, polyisocyanates containing uret dione rings may react during polyaddition to form biurets or even as free monomeric diisocyanates, depending on the type and quantity of amidine used for thermal crosslinking (uret dione ring cleavage). This means that, for the same formulation of the active hydrogen starting components, but with different isocyanate amounts (ratio of uret dione diisocyanate NCO:active hydrogen=0.1 to 1 and higher), polyurethane elastomers having rigid segments of different structure and, hence, different mechanical properties can be formed. In addition, where an excess of isocyanate is used, additional further reactions, such as allophanatization, biuretization or trimerization, or—in the presence of water—even foam formation can generally occur in the absence of further catalysts.

Suitable starting components for the solid polyisocyanates stabilized in accordance with the invention include any di- or polyisocyanates or mixtures thereof, providing they have a melting point above 30° C., preferably above 80° C. and, more preferably, above 130° C.

These di- or polyisocyanates may be aliphatic, cycloaliphatic, araliphatic, but preferably aromatic and heterocyclic polyisocyanates. Also useful are polyphenyl polymethylene polyisocyanates obtained by phosgenating aniline-formaldehyde condensates in accordance with British Patents 874,430 and 848,671; perchlorinated aryl polyisocyanates; polyisocyanates containing carbodiimide groups; polyisocyanates containing allophanate groups; polyisocyanates containing isocyanurate groups; polyisocyanates containing urethane or urea groups; polyisocyanates containing acylated urea groups; polyisocyanates containing biuret groups; polyisocyanates produced by telomerization reactions; polyisocyanates containing ester groups; and, preferably, diisocyanates containing uret dione groups and diisocyanates containing urea groups. The following are specific examples of suitable polyisocyanates:

| | M.p.: |
|---|---|
| p-xylylene diisocyanate | 45–46° C. |
| 1,5-diisocyanato-methyl naphthalene | 88–89° C. |
| 1,3-phenylene diisocyanate | 51° C. |
| 1,4-phenylene diisocyanate | 94–96° C. |
| 1-methylbenzene-2,5-diisocyanate | 39° C. |
| 1,3-dimethylbenzene-4,6-diisocyanate | 70–71° C. |
| 1,4-dimethylbenzene-2,5-diisocyanate | 76° C. |
| 1-nitrobenzene-2,5-diisocyanate | 59–61° C. |
| 1,4-dichlorobenzene-2,5-diisocyanate | 134–137° C. |
| 1-methoxybenzene-2,4-diisocyanate | 75° C. |
| 1-methoxybenzene-2,5-diisocyanate | 89° C. |
| 1,3-dimethoxybenzene-4,6-diisocyanate | 125° C. |
| azobenzene-4,4'-diisocyanate | 158–161° C. |
| diphenylether-4,4'-diisocyanate | 66–68° C. |
| diphenylmethane-4,4'-diisocyanate | 42° C. |
| diphenyl-dimethylmethane-4,4'-diisocyanate | 92° C. |
| naphthalene-1,5-diisocyanate | 130–132° C. |
| 3,3'-dimethylbiphenyl-4,4'-diisocyanate | 68–69° C. |
| diphenyldisulfide-4,4'-diisocyanate | 58–60° C. |
| diphenylsulfone-4,4'-diisocyanate | 154° C. |
| 1-methylbenzene-2,4,6-triisocyanate | 75° C. |
| 1,3,5-trimethylbenzene-2,4,6-triisocyanate | 93° C. |
| triphenylmethane-4,4',4''-triisocyanate | 89–90° C. |
| 4,4'-diisocyanato-(1,2)-diphenylethane | 88–90° C. |
| dimeric 1-methyl-2,4-phenylene diisocyanate | 156° C. |
| dimeric 1-isopropyl-2,4-phenylene diisocyanate | 125° C. |
| dimeric 1-chloro-2,4-phenylene diisocyanate | 177° C. |
| dimeric 2,4'-diisocyanato-diphenylsulfide | 178–180° C. |
| dimeric diphenylmethane-4,4'-diisocyanate | |
| 3,3'-diisocyanato-4,4'-dimethyl-N,N'—diphenylurea | |
| 3,3'-diisocyanato-2,2'-dimethyl-N,N'—diphenylurea | |
| N,N'—bis-[4-(4-isocyanatophenylmethyl)-phenyl]-urea | |
| N,N'—bis-[4-(2-isocyanatophenylmethyl)-phenyl]-urea. | |

According to the invention, dimeric 1-methyl-2,4-diisocyanatobenzene, dimeric 4 4'-diisocyanatodiphenylmethane, 3,3'-dimethyl-4,4'-diisocyanatodiphenyl, 3,3'-diisocyanato-4,4'-dimethyl-N,N'-diphenylurea, bis-N,N'-[4-(4-isocyanatophenylmethyl)-phenyl]-urea, 1,5-naphthalene diisocyanate and 1,4-phenylene diisocyanate are particularly preferred.

In combination with the amidine/guanidine stabilizers, other stabilizers can also be used. Examples include difunctional or higher, low molecular weight or relatively high molecular weight compounds containing aliphatically bound, primary and/or secondary amino groups and having a molecular weight of from 62 to about 6000 and preferably from 60 to 3000. When used, such amines are used in small quantities (up to at most 50 equivalent percent per amidine/guanidine equivalent). The amine compounds include low molecular weight and/or relatively high molecular weight primary and/or secondary aliphatic polyamines, and preferably diamines. In these compounds, the amino groups are attached to aliphatic (including cycloaliphatic) radicals or to the aliphatic moiety of an araliphatic radical. In addition to the amino groups, these aliphatic di- and polyamines may also contain hydroxy groups, tertiary amino groups, ether groups, thioether groups, urethane groups, urea groups, carboxyl groups or carboxylic acid alkyl ester groups.

Di- and polyamines suitable for use as co-stabilizers include, for example, ethylene diamine; 1,2- and 1,3-propane diamine; 1,4-butane diamine; 1,6-hexane diamine; neopentane diamine; 2,2,4- and 2,4,4-trimethyl-1,6-diaminohexane; 2,5-diamino-2,5-dimethylhexane; 1,10-decane diamine; 1,11-undecane diamine; 1,12-dodecane diamine; bis-aminomethyl-hexahydro-4,7-methanoindane (TCD diamine); 1,3-cyclohexane diamine; 1,4-cyclohexane diamine; 1-amino-3,3,5-trimethyl-5-aminomethyl cyclohexane (isophorone diamine); 2,4- and/or 2,6-hexahydrotolylene diamine; 2,4'- and/or 4,4'-diaminodicyclohexylmethane; m- or p-xylylene diamine; bis-(3-aminopropyl)-methylamine; bis-N,N'-(3-aminopropyl)-piperazine; 1-amino-2-aminomethyl-3,3,5-(3,5,5)-trimethylcyclopentane; 2,2-dialkylpentane-1,5-diamines; 1,5,11-triaminoundecane; 4-aminomethyl-1,8-diaminooctane; lysine methyl ester; cycloaliphatic triamines according to German Offenlegungsschrift No. 2,614,244; 4,7-dioxadecane-1,10-diamine; 2,4- and 2,6-diamino- 3,5-diethyl-1-methylcyclohexane and mixtures thereof; alkylated diaminodicyclohexylmethanes, such as for example 3,3'-dimethyl-4,4'-diaminodicyclohexyl methane or 3,5-diisopropyl-3',5'-diethyl-4,4'-diaminodicyclohexylmethane; perhydrogenated diaminonaphthalenes; perhydrogenated diaminoanthracenes; diethylene triamine; triethylene tetramine; pentaethylene hexamine; dipropylene triamine; tripropylene tetramine; N,N'-dimethylethylene diamine; 2,5-dimethyl piperazine; 2-methyl piperazine; piperazine (hydrate); and 2-hydroxyethyl piperazine.

In addition to these relatively low molecular weight aliphatic diamines or in admixture therewith, it is also possible to use relatively high molecular weight aliphatic di- and polyamines of the type obtained, for example, by the reductive amination of polyoxyalkylene glycols with ammonia in accordance with Belgian Pat. No. 634,741 or U.S. Pat. No. 3,654,370. Other polyoxyalkylene polyamines of relatively high molecular weight may be obtained by methods of the type described in the booklet entitled "Jeffamine, Polyoxypropylene Amines" published by the Texaco Chemical Co., 1978; by the hydrogenation of cyanoethylated polyoxypropylene glycols (German Offenlegungsschrift No. 1,193,671); by the amination of polypropylene glycol sulfonic acid esters (U.S. Pat. No. 3,236,895); by treating a polyoxyalkylene glycol with epichlorohydrin and a primary amine (French Pat. No. 1,466,708); or by reacting NCO-prepolymers with enamines, aldimines or ketimines containing hydroxyl groups, followed by hydrolysis in accordance with German Auslegeschrift No. 2,546,536. Other suitable aliphatic di- and polyamines of relatively high molecular weight are the polyamines obtainable by the alkaline base hydrolysis of NCO-prepolymers (synthesized with aliphatic diisocyanates) via the carbamate stage as described in German Offenlegungsschriften Nos. 2,948,419 and 3,039,600. These relatively high molecular weight polyamines have molecular weights of from about 400 to 6000, preferably from 400 to 3000 and, more preferably, from 1000 to 3000. By virtue of their structure, relatively high molecular weight polyamines such as these are particularly suitable for the formation of a non-brittle, elastic, polyurea coating. Accordingly, in some cases, such amines are preferably used with the amidine/guanidine compounds and low molecular weight di- and polyamino compounds for stabilizing the polyisocyanate particles.

Other co-stabilizers used for the above-mentioned polyisocyanates include hydrazine, alkyl hydrazines and N,N'-dialkyl hydrazines, preferably containing $C_1$-$C_6$-alkyl groups, which may even contain chlorine or OH-groups as further substituents (molecular weights preferably in the range from 32 to 198), and/or difunctional or higher, low molecular weight or relatively high molecular weight compounds containing terminal —CO—NH—NH$_2$ groups and having a molecular weight of from 90 to about 6000 and preferably from 90 to 3000. Compounds such as these include, for example, hydrazine, generally in the form of hydrazine hydrate; and alkyl substituted hydrazines, for example methyl hydrazine, ethyl hydrazine, hydroxyethyl hydrazine or N,N'-dimethylhydrazine. Other suitable "co-stabilizers" are compounds containing terminal hydrazide groups, such as, for example, di- or polyhydrazides, such as carbodihydrazide, hydracrylic acid hydrazide, oxalic acid dihydrazide, adipic acid dihydrazide, terephthalic acid dihydrazide, and isophthalic acid hydrazide; compounds containing hydrazide and semicarbazide, carbazinic ester or amino groups, such as, for example, β-semi-carbazidopropionic acid hydrazide, 2-semicarbazidoethylene carbazinic ester, aminoacetic acid hydrazide, β-aminopropionic acid hydrazide; bis-carbazinic esters or bis-semicarbazides, such as ethylene-bis-carbazinic ester or ethylene-bis-semicarbazide or isophorone-bis-semicarbazide. Hydrazine and low molecular weight compounds containing —CO—NH—NH$_2$ groups and having molecular weights of from 32 to 399 are preferred. Hydrazine hydrate, β-semicarbazidopropionic acid hydrazide and alkylene-bis-semicarbazides are particularly preferred.

The amidine/guanidine stabilizers are used in a quantity of from 0.1 to 25 equivalent percent of amidine/guanidine groups per isocyanate equivalent in the polyisocyanate, preferably in a quantity of from 0.1 to 12.5 equivalent percent and, more preferably, in a quantity of from 0.3 to 8 equivalent percent. Although coating with the polyadduct may be carried out with even higher percentages, for example 30 equivalent percent per NCO equivalent, conversions as high as these excessively reduce the proportions of reactive isocyanate groups where the stabilized isocyanates are used in polyurethane one-component reactive systems because excessive quantities of stabilizers are released or are reacted in the reactive mixture.

The reaction is carried out at temperatures below the particular melting temperatures of the polyisocyanates. They are generally below 70° C. and preferably in the range from 0° to 50° C.

Stabilization of the isocyanate solid at room temperature is generally completed within a few minutes, so that production of the one-component systems may even be carried out continuously. One-component polyurethane systems using the stabilized polyisocyanates according to the invention must, on the one hand, show virtually unlimited stability in storage at room temperature or moderately elevated temperatures (for example, in the range from 50° to 60° C.) and, on the other hand, must undergo rapid crosslinking at temperatures above about 100° C. The demands which the stabilized polyisocyanates have to satisfy in practice may be controlled both by the quantity and by the chemical constitution of the stabilizers and by the reaction conditions under which the reaction is carried out. If a quantity of amidine/guanidine, amounting, for example, to 25 equivalent percent, based on free NCO, is exceeded during the stabilizing reaction, only unsatisfactory crosslinking, if any, takes place under the usual heating conditions (110° to 140° C.) where the stabilized polyisocyanates are used in polyurethane reactive systems. Accordingly, it is advisable initially to determine the optimal addition of the particular stabilizer for the required formulation and then to establish the hardening temperature and hardening time for adequate stability in storage (for example 14 days at 50° C.) of the one-component systems.

In the process according to the invention, the stabilization of the solid polyisocyanates by coating with polyadduct is carried out in a liquid medium which is not a good solvent for the solid polyisocyanates.

The liquid medium may consist of (i) low molecular weight and/or, preferably, relatively high molecular weight mono- and/or (preferably) polyols and/or (ii) aromatic polyamines having molecular weights of from 62 to 6000 and/or (iii) in the event of subsequent suspension or in limited quantities, even relatively high molecular weight aliphatic polyamines having molecular weights of from 400 to 6000. However, it is preferred to use relatively high molecular weight polyols and/or more particularly, relatively high molecular weight aromatic polyamines having a molecular weight in the range from 400 to 6000, preferably from 400 to 3000 and, more preferably, from 1000 to 3000, optionally in combination with low molecular weight polyols and/or aromatic low molecular weight polyamines.

Examples of the monoalcohols suitable for use as the liquid medium are relatively long chain alcohols, such as isohexadecanol and propoxylation products monohydric alcohols having molecular weights of preferably from 400 to 6000 (for example propoxylation products of n-butanol). However, monoalcohols are less preferred because they cannot be directly further used as suspending agents for polyisocyanates in the synthesis of polyurethanes because they act as chain terminators. Accordingly, they must first be removed in an additional step before the polymer-coated polyisocyanates are used in the polyurethane-forming reactive systems.

Suitable low molecular weight polyols include, for example, 1,4-butane diol, 1,10-decane diol, neopentyl glycol, tetra-(hydroxypropyl)-ethylene diamine or castor oil.

The relatively high molecular weight polyols include for example, polyoxyalkylene polyols, for example polyoxytetramethylene glycols, or ethoxylation and/or propoxylation products of low molecular weight di- and polyols or di- and polyamines, for example propoxylated trimethylol propane, propoxylated ethylene diamine or linear or branched polypropylene glycol ethers which may contain oxyethylene groups in random, block-like or terminal form and which, overall, have molecular weights of from 400 to 6000.

In one embodiment, for example, difunctional or higher, relatively high molecular weight polyols, optionally in conjunction with low molecular weight polyols, are used as the liquid medium for suspending the stabilized polyisocyanates which are directly used as reactants containing hydroxyl groups in the production of polyurethanes.

Accordingly, it is possible to use any of the relatively high molecular weight compounds containing terminal OH-groups normally used for the synthesis of polyurethanes, such as polyethers, polyacetals, polythioethers or even polyesters; examples of these compounds can be found in German Offenlegungsschrift No. 2,920,501.

Where the suspension of the stabilized polyisocyanates in the polyols is directly used for one-component polyurethane systems, the (relatively high molecular weight) polyols may also contain corresponding quantities of low molecular weight polyols, preferably diols, and/or, more particularly, aromatic polyamines, preferably diamines, as chain-extending agents which have molecular weights of from 60 to 399. In many cases, these chain-extending agents are only added to the suspensions of the polyisocyanates on completion of the coating reaction. The low molecular weight aromatic polyamines may also be added with particular advantage to the system (as chain-extending agents) where corresponding one-component polyurethane systems are being produced. The components are preferably reacted in quantities which correspond to the formulation of the one-component polyurethane systems.

Suitable relatively high molecular weight polyhydroxyl compounds, which may be used both as suspension medium for the polyisocyanates and also as further reactive components for the production of polyurethanes, include difunctional or higher polyhydroxyl compounds containing from 2 to 8 and preferably from 2 to 4 hydroxyl groups and having a molecular weight of from 400 to 6000. The polyhydroxyl compounds in question include polyesters, polyethers, polythioethers, polyacetals, polycarbonates, polylactones or polyester amides containing at least two hydroxyl groups and also polybutadiene compounds or mixtures thereof, of the type known for the production of homogeneous, cellular or foam-like polyurethanes. Polyethers and polyesters are particularly preferred.

The polyethers in question are known and are obtained, for example, by polymerizing tetrahydrofuran or epoxides, such as ethylene oxide, propylene oxide, butylene oxide, styrene oxide or epichlorohydrin or by the addition of these epoxide compounds (preferably ethylene oxide or propylene oxide), optionally in admixture or successively, onto starter components containing reactive hydrogen atoms, such as water, polyhydric alcohols, ammonia or polyfunctional amines or sugars.

The hydroxyl-containing polyesters in question include, for example, reaction products of polyhydric, preferably dihydric, and optionally trihydric and higher alcohols with polybasic, preferably dibasic, polycarboxylic acids or their anhydrides or corresponding polycarboxylic acid esters of lower alcohols.

Polyesters of lactones, for example, ξ-caprolactone, or of hydroxy carboxylic acids, for example ω-hydroxy caproic acid, may also be used, particularly if they contain additional components, such as diethylene glycol or 1,4-butane diol, to reduce their high crystallinity.

Suitable polyacetals include, for example, the compounds obtainable from glycols and formaldehyde.

The hydroxyl-containing polycarbonates in question include those, for example of the type which may be obtained by reacting 1,3-propane diol, 1,4-butane diol and/or 1,6-hexane diol, di-, tri- or tetraethylene glycol or thiodiglycol, with diaryl carbonates, (for example, diphenyl carbonates) or phosgene.

Polybutadienes containing terminal hydroxyl groups are also suitable for use in accordance with the invention because they give particularly elastic and hydrolysis-stable products. It is also possible to use polyhydroxyl compounds containing high molecular weight polyadducts or polycondensates or polymers in finely dispersed or even dissolved form. Polyhydroxyl compounds such as these are obtained, for example, by carrying out polyaddition reactions, (for example reactions between polyisocyanates and amino functional compounds) or polycondensation reactions (for example between formaldehyde and phenols and/or amines) in situ in the above-mentioned compounds containing hydroxyl groups.

Polyhydroxyl compounds modified by vinyl polymers, of the type obtained, for example, by polymerizing styrene and acrylonitrile in the presence of polyethers or polycarbonate polyols, are also suitable for use in the process according to the invention.

Further representatives of the above-mentioned compounds suitable for use in accordance with the invention are described in detail, for example, in High Polymers, Vol. XVI, "Polyurethanes, Chemistry and Technology", by Saunders-Frisch, Interscience Publishers, New York/London, Vol. I, 1962, Pages 32 to 42 and Pages 44 to 54 and Vol. II, 1964, Pages 5 to 6 and 198 to 199, and in Kunststoff-Handbuch, Vol. VII, Vieweg-Hochtlen, Carl-Hanser-Verlag, Munich, 1966, for example on Pages 45 to 71 and in DE-A No. 2,854,384.

It is of course possible to use mixtures of the above-mentioned polyhydroxyl compounds. The polyhydroxyl compounds may of course also be pre-extended with substoichiometric quantities of diisocyanates.

Liquid or low-melting (<50° C.), low molecular weight and/or relatively high molecular weight aromatic polyamines and/or relatively high molecular weight aliphatic polyamines can also be used as the liquid medium. Low molecular weight aromatic polyamines (molecular weight up to 399) as sole liquid medium are less preferred. Relatively high molecular weight polyamines are preferred optionally in combination with low molecular weight polyamines, while aromatic diamines are preferred as the chain-extending agents.

The relatively high molecular weight polyamino compounds containing aromatic amino groups and having molecular weights in the range from 400 to 6000 which are used in accordance with the invention include, in particular, polyamino compounds of the type which can be obtained by the (preferably basic) hydrolysis of the corresponding isocyanate-terminated prepolymer based on relatively high molecular weight polyhydroxyl compounds and excess aromatic diisocyanates. Examples of this process are given in German Auslegeschriften Nos. 2,948,419, 3,039,600, and 3,112,118 and European Patent Applications Nos. 61,627, 71,132 and 71,139. The first of these patents also mentions other state-of-the-art processes for producing aromatic amino compounds of relatively high molecular weight structure of the type suitable for use in the process according to the invention. The process according to German Auslegeschrift No. 2,948,419 and the other patents cited are preferably used for the production of polyether polyamines, although they may also be used for the production of polyester, polyacetal, polythioether or polycaprolactone polyamines, and preferably di- or trifunctional polyamines which contain urethane groups (from the reaction of the corresponding relatively high molecular weight polyhydroxyl compounds with the excess polyisocyanate) and which carry the amino groups on the residue of the (former) polyisocyanate. However, the aromatic, relatively high molecular weight polyamines may also be produced by other methods, for example, by reacting NCO-prepolymers with excess quantities of hydrazine, amino phenylethylamine or other diamines in accordance with German Auslegeschrift 1,694,152. Another possible method is described in French Pat. No. 1,415,317, according to which the NCO-prepolymers are converted by reaction with formic acid into the N-formyl derivatives which are then hydrolyzed. The reaction of NCO-prepolymers with sulfamic acid in accordance with German Auslegeschrift No. 1,155,907 also gives polyamines of relatively high molecular weight.

In addition to amino groups (from aromatic polyisocyanates) attached to aromatic radicals, it is also possible to produce, by using aliphatic polyisocyanates relatively high molecular weight polyamine compounds containing amino groups attached to aliphatic radicals. These relatively high molecular weight polyamines may also be pre-extended by reaction with substoichiometric quantities of diisocyanates. These relatively high molecular weight aliphatic polyamines, of the type already described as relatively high molecular weight "amine co-stabilizers" may be used both as amine stabilizer and also as the liquid medium where the stabilizing reaction is carried out at low temperatures, for example room temperature. In that case, the stabilizing reaction surprisingly comes to a standstill after less than 25% of all the NCO-groups have been reacted. It is generally preferred that the stabilizing reaction be carried out first. However, if the temperature is correspondingly increased beyond the thickening temperature, for example to 120° C., all the aliphatic amino groups are fully reacted with the isocyanate groups.

Plasticizer-like compounds with boiling points above 250° C., for example phthalates, (suoh as dioctyl, diisododecyl, dibenzyl, butylbenzyl phthalate) or even phosphates containing up to 8 C-atoms in the alkyl radical (such as trioctyl phosphate) may also be used or jointly used as liquid medium in the stabilization of the isocyanates. Hydrocarbons, such as so-called butadiene oils, or polyether polyols, of relatively high molecular weight (400-10,000 molecular weight), may also be used as the liquid medium. In that case, the finely powdered solid isocyanate is stirred into a solution of the stabilizer in the plasticizer, as far as possible at room temperature. If it is intended to use the stabilized isocyanates in the suspension thus formed, the other starting components required, such as relatively high molecular weight aromatic polyamines for example, may be added after stabilization of the polyisocyanate. However, these plasticizers may also be used in admixture with polyamines of relatively high molecular weight as the liquid medium for forming the suspension of the stabilized polyisocyanates. The stabilized polyisocyanates may also be isolated, for example by filtration, and subsequently suspended in the polyol and/or polyamine compounds of relatively high molecular weight, although this is preferably not the case.

Surprisingly, water is also suitable for use as the liquid medium, in which case the stabilizers are added to the water and the solid polyisocyanates are mixed with the resulting solution.

Where water is used as the principle liquid medium, the stabilized polyisocyanate is generally isolated by filtration, optionally carefully dried, and, added in this isolated, finely powdered form to the desired relatively high molecular weight polyols and/or polyamines and any other starting components necessary for the one-component polyurethane mixtures. However, this intermediate stage of isolating the stabilized polyisocyanates is not preferred. Apolar or weakly polar, low molecular weight solvents with molecular weiqhts<400, such as, for example aliphatic, cycloaliphatic or aromatic hydrocarbons, halogenated hydrocarbons, ethers, ketones or esters, preferably having boiling points below 146° C., may optionally be added to the liquid medium mentioned (polyols, polyamines, plasticizers or water). In this way, it is possible if desired to obtain a reaction in a medium of lower viscosity. The solvents are best removed again afterwards, for example by distillation in vacuo. The stabilizing reaction may also be carried out in weakly polar or unpolar solvents which are not capable of significantly dissolving the polyisocyanates, for example in hydrocarbons, in which case the stabilized products are isolated by filtration or distilling off the solvent and subsequently suspended in the relatively high molecular weight polyols and/or polyamines.

The stabilizing reactions described in the foregoing produce a suspension of surface-modified, stabilized solid polyisocyanates in the liquid medium. The suspensions contain at least 3% by weight, preferably at least 5% by weight and, in most cases, at least 7.5% by weight of solid, stabilized polyisocyanates. The solids contents are generally below 70% by weight, preferably below 50% by weight and, in most cases, below 40% by weight.

The present invention also relates to the use of surface-modified, stabilized, solid polyisocyanates of retarded reactivity obtained by the described processes, preferably suspended in low molecular weight and/or relatively high molecular weight polyols and/or low molecular weight and/or relatively high molecular weight aromatic polyamino compounds and/or relatively high molecular weight aliphatic polyamino compounds in accordance with the production processes described in the foregoing and the compositions of the suspensions described in the foregoing, as polyisocyanate component (A) and relatively high molecular weight polyol and/or polyamino compounds (B) and, optionally, low molecular weight chain-extending agents (C) for the production of polyurethanes and preferably for the production of polyurethanes by way of storable one-component systems, from
(A) polyisocyanates,
(B) relatively high molecular weight polyhydroxyl and-/or polyamino compounds,
(C) optionally low molecular weight chain-extending agents,
(D) optionally polyurethane catalysts and
(E) optionally standard auxiliaries and additives.

The polyisocyanates of retarded reactivity may be used in the production of polyurethanes where the reaction time (pot life) is extended (for example in the case of casting systems). They may also be used in the production of one-component systems which may be stored for prolonged periods at low temperatures and which are only reacted, for example, by increasing temperature or by the use of polar solvents.

More particularly, the invention relates to the use of suspensions of polyadduct-coated polyisocyanates obtained by the processes described herein for the production of polyurethanes from components (A) to (E), characterized in that the polyadduct-coated, suspended polyisocyanates are used as polyisocyanate component (A) in relatively high molecular weight components (B) and, optionally, chain-extending agents (C), optionally in conjuction with other, unstabilized polyisocyanates (A), relatively high molecular weight compounds (B), and chain-extending agents (C), optionally in the presence of tertiary amine and/or metal catalysts (D) and auxiliaries (E) for the production of free-flowing or readily melting reactive polyurethane systems having a thickening temperature of $\geq 55°$ C. The PU-reactive systems thus obtained are hardened by heat, shear force and/or polar solvents to form solid or cellular polyurethanes.

One particularly preferred form of use for the production of polyurethanes is the use of the polyisocyanates stabilized by the above-mentioned amidines/-guanidine stabilizers, in suspension in relatively high molecular weight aromatic and/or aliphatic polyamines, optionally in combination with low molecular weight aromatic polyamines, preferably diamines, and-/or, optionally, low molecular weight polyols having molecular weights in the range from 62 to 399. In this case, no catalysts are required for hardening to form the polyurethane(urea). The temperatures and hardening times are respectively lower and shorter than in the case of polyol systems. Also, very favorable elastomer properties are obtained.

Another preferred form of use in the production of polyurethanes is the use of polyisocyanates stabilized with amidine/guanidine stabilizers in suspension in relatively high molecular weight polyols (B) in combination with aromatic polyamines as chain-extending agents (C), component (C) already having been used in the preparation of the suspension or being subsequently added as chain-extending agent to the polyurethane-forming reactive mixture. A mixture such as this may also additionally contain low molecular weight polyols as chain-extending agents. In that case, at least 10 mole percent and preferably at least 50 mole percent of the chain-extending agents (C) are used in the form of aromatic polyamines (preferably diamines) in addition to optionally low molecular weight polyols. These systems are also distinguished by favorable hardening behavior and, compared with systems containing only polyol chain extenders, by better elastomer properties, such as, for example, strengths, hardness, moduli and softening ranges.

The surface-modified, stabilized, solid polyisocyanates of retarded reactivity are preferably used as sole polyisocyanate (A) in the synthesis of polyurethanes. However, it is also possible to use combinations of the polyisocyanates stabilized in accordance with the invention and unstabilized polyisocyanates, such as tolylene diisocyanates, diphenylmethane diisocyanates, naphthylene-1,5-diisocyanate, dimeric tolylene diisocyanate or isophorone diisocyanate. In these combinations, however, the polyisocyanates stabilized in accordance with the invention are preferably used in a quantity of at least 50 equivalent percent.

Suitable unstabilized polyisocyanates include any of the polyisocyanates described in German Offenlegungsschrift No. 2,920,501 (pages 12-16).

In cases where suspensions of the stabilized polyisocyanates in the relatively high molecular weight polyhydroxy and/or relatively high molecular weight polyamino compounds (B) are used, the quantities of relatively high molecular weight compounds (B) may with advantage be selected in such a way that the composition already corresponds to the desired, polyurethane-forming component mixture ("one-component reactive mixture"). However, if the composition does not correspond to the required polyurethane-forming mixture, it is possible to use additional identical or different, relatively high molecular weight components (B) for the polyurethane production.

Similarly, even the polyol or aromatic polyamine chain-extending agents (C) may be used for the stabilizing reaction in quantities suitable for one-component systems. Otherwise, (C) may be added as further chain-extending component(s). In one embodiment, for example, the suspension of stabilized polyisocyanates in the relatively high molecular weight compounds (B) and, optionally, the low molecular weight compounds (C) is prepared by ensuring that the suspension contains an excess of hydroxyl and/or amino groups and subsequently reacting it with an untreated polyisocyanate (such as tolylene diisocyanate, diphenylmethane diisocyanate, dicyclohexyl methane diisocyanate or isophorone diisocyanate), in such a way that all the hydroxyl and/or amino groups are able to react with the isocyanate groups from stabilized and unstabilized polyisocyanates.

In another embodiment, the unstabilized polyisocyanate is reacted with an excess of hydroxy and/or amino compounds to form a processible intermediate product containing OH or $NH_2$-groups and then the stabilized polyisocyanate or the polyisocyanate to be stabilized is suspended in that intermediate product.

If the suspension of stabilized polyisocyanates in the relatively high molecular weight compounds (B) and, optionally, the chain-extending agents (C) contains an excess of isocyanate groups (from the treated polyisocyanates according to the invention), additional relatively high molecular weight compounds (B) or low molecular weight compounds (C) may be added to the reaction mixture and reacted to form the polyurethane. This may be done, for example, by introducing the polyisocyanate suspension on the one hand and the other components through separate pipes, mixing them and then thermally hardening the resulting mixture, for example in a mold.

A preliminary decision as to whether a certain combination according to the invention of a solid isocyanate with an amidine/guanidine stabilizer is suitable for producing storable one-component reactive polyurethane systems may be made on the basis of the following tests for determining the "thickening temperature":

"DETA-Test" for characterizing the coated polyisocyanates ("thickening temperature")

1 mole of the solid diisocyanate modified with the amidine/guanidine stabilizer is suspended in 1000 g of a linear polyoxypropylene ether diol having a molecular weight of 2000. Following the addition of 0.5 mole of a 65:35 mixture of 2,4- and 2,6-diamino-3,5-diethyl toluene isomers (DETA), the one-component reactive mixture suspension is heated at a rate of approximately 10° C. per minute. The temperature at which the mixture rapidly assumes a paste-like consistency and solidifies is termed the "thickening temperature".

Experience has shown that a thickening temperature below 55° C. indicates that a particular combination of solid polyisocyanate and stabilizer in the existing concentration is not suitable for use in long-lasting one-component PU-reactive systems (although in the case of casting systems, for example, it may even lead to a desirable increase in the casting time).

Polyisocyanates of retarded reactivity obtained by amidine/guanidine stabilization, which show thickening temperatures below 55° C. in the DETA-test are unsuitable according to the invention for the suspensions according to the invention in relatively high molecular weight polyamines.

If the polyisocyanates modified in accordance with the invention are suspended in a medium, for example in relatively high molecular weight polyols or polyamines, which is suitable for the further polyurethane-forming reaction, this suspension may be further used as such. However, it is possible, although less preferred, to isolate the stabilized polyisocyanates from the suspension, for example, by filtration, (preferably where water, monoalcohols or larger quantities of plasticizer and/or solvent are used) and to add them in powder form to the desired reaction components (the relatively high molecular weight polyols and/or polyamines (B), optionally other relatively high molecular weight polyols (B) of similar or different structure and, optionally, low molecular weight chain-extending agents (C)).

Particular significance is attributed in practice to storable suspensions of the stabilized polyisocyanates in relatively high molecular weight polyamines (B), optionally in combination with other relatively high molecular weight polyols (B) and/or chain-extending agents (C), for example low molecular weight polyamines and low molecular weight polyols, of the type which may be directly used for the one-component reaction or for the formulation of one-component systems. The components are preferably reacted in quantitative and equivalent ratios which directly correspond to a formulation of one-component PU-reactive systems.

The long-lasting one-component PU-reactive systems, which may be hardened to form solid or foamed polyurethanes, are preferably produced by in situ stabilization of the polyisocyanates using the amidine/guanidine stabilizers, optionally in the presence of co-stabilizers, in the presence of the relatively high molecular weight polyol or polyamine compounds (B) required for the one-component polyurethane system, optionally in combination with other relatively high molecular weight polyhydroxyl compounds (B) and, optionally, low molecular weight polyols and/or aromatic polyamines as chain-extending agents (C). In this case, the suitable amidine/guanidine stabilizer determined in preliminary tests is added in the requisite concentration in relatively high molecular weight polyols or polyamines (for example to the polyhydroxyl polyethers, polyesters or polycarbonates or to the aminopolyethers, aminopolyesters or aminopolyacetals) at preferably as low a temperature as possible (room temperature). The (powder-form) polyisocyanate solid at room temperature is then added, with the stabilized polyisocyanates being formed within a few minutes. The desired low molecular weight chain-extending agents (C), preferably aromatic polyamines or low molecular weight (aliphatic or cycloaliphatic) polyol compounds, optionally other relatively high molecular weight polyhydroxyl or polyamino compounds (B) and, optionally, the desired catalyst (D) and the usual auxiliaries and additives (E) may be added to the suspension either beforehand or afterwards.

As already mentioned, the long-lasting one-component reactive systems according to the invention are preferably produced using low molecular weight chain-extending agents or crosslinking agents (component (C)).

The low molecular weight chain-extending agents or crosslinking agents (component (C)) are difunctional or higher compounds which contain hydroxyl groups attached to aliphatic and/or cycloaliphatic radicals (polyols) and/or $NH_2$-groups attached to aromatic, including heterocyclic rings of aromatic character (polyamines) and which have molecular weights of from 62 to 399. Preferred are low molecular weight diols containing hydroxyl groups attached to aliphatic or cycloaliphatic radicals and aromatic diamines having a molecular weight in the range from 108 to 399. These compounds generally contain from 2 to 8, preferably from 2 to 4 and, more preferably 2 isocyanate-reactive hydrogen atoms such as hydroxyl and/or amino groups. Mixtures of different compounds of type (C) may of course also be used. examples of such compounds include ethylene glycol; trimethylene glycol; 2,3-and/or 1,4-butane diol; 1,6-hexane diol; neopentyl glycol; 1,4-bis-hydroxyethyl cyclohexane; 1,4-dihydroxy cyclohexane; terephthalic acid-bis-($\beta$-hydroxy-ethyl)-ester; 1,4,3,6-dianhydrohexitols; 1,4-mono-anhydrotetritols; and, less preferably, diols containing secondary hydroxyl groups, such as, for example, propylene glycol, 2,3-butane diol or 2,5-pentane diol. examples of polyfunctional compounds include trimethylol propane; trimethylol ethane; 1,2,6-hexane triol; glycerol; pentaerythritol; quinitol; mannitol; sorbitol, castor oil; di-, tri- and tetraethylene, propylene and butylene glycols; bis-(2-hydroxyethyl)-hydroquinone; bis-(2-hydroxyethyl)-resorcinol; formose; or formitol. Diols or polyols containing tertiary amines, such as N-methyl diethanolamine, triethanolamine or N,N'-bis-hydroxyethyl piperazine, are also suitable.

Low molecular weight aromatic diamines are preferably used instead of low molecular weight polyols. Aromatic polyamines are also understood to include amines in which the amino group is attached to heterocyclic radicals of aromatic character. examples of suitable aromatic polyamines include, for example, p-phenylene diamine; 2,4-/2,6-tolylene diamines; diphenylmethane-4,4'- and/or -2,4'- and/or -2,2'-diamines; 3,3'-dichloro-4,4'-diaminodiphenylmethane; 3-($C_1$-$C_8$)-alkyl-4,4'-diaminodiphenylmethanes; 3,3'-di-($C_1$-$C_4$)-4,4'-diaminodiphenylmethanes; 3,3',5,5'-tetra-($C_1$-$C_4$)-alkyl-4,4'-diphenylmethanes; 4,4'-diaminodiphenyl sulfides, sulfoxides or sulfones; diamines containing ether groups according to German Auslegeschriften Nos. 1,770,525 and 1,809,172 (U.S. Pat. Nos. 3,654,364 and 3,736,295); 2-halogen-1,3-phenylene diamines optionally substituted in the 5-position (German Auslegeschriften Nos. 2,001,772, 2,025,896 and 2,065,869); bis-anthranilic acid esters (German Auslegeschriften Nos. 2,040,644 and 2,160,590); 2,4-diaminobenzoic acid esters according to German Auslegeschriften No. 2,025,900; and tolylene diamines substituted by one or two ($C_1$-$C_4$)-alkyl groups. Particularly preferred are 3,5-diethyl-2,4- and/or -2,6-diaminotoluene (particularly their technical (80:20)- or (65:35)-isomer mixtures); asymmetrically tetra-alkyl-substituted diaminodiphenylmethanes, for example 3,5-diethyl-3',5'-diisopropyl-4,4'-diaminodiphenylmethane and isomer mixtures thereof according to German Auslegeschrift No. 2,902,090, 4,4'-diaminobenzanilide; 3,5-diaminobenzoic acid-($C_1$-$C_4$)-alkyl esters; 4,4'- and/or 2,4'-diaminodiphenylmethane; and naphthylene-1,5-diamine.

The aromatic diamines are preferred to the glycols. However, it is also possible to use diols or diamines containing additional groups, for example adipic acid-bis-(2-hydroxyethyl)-ester; terephthalic acid-bis-(2-hydroxyethyl)-ester; diol urethanes; diol ureas; or polyols containing sulfonate and/or phosphonate groups. Specific examples include 1,6-hexamethylene-bis-(2-hydroxyethyl-urethane), 4,4'-diphenylmethane-bis-(2-hydroxyethylurea) or the adduct of sodium bisulfite with 1,4-butene diol and alkoxylation products thereof. Other low molecular weight compounds (C) are described in detail in German Auslegeschrift No. 2,854,384.

In addition, isocyanate-monofunctional compounds may optionally be used in the usual way as so-called chain terminators in quantities of from 0.1 to 10% by weight. Monofunctional compounds of this type include for example, monoamines, such as butyl or dibutylamine, stearyl amine, pyrrolidone, aniline or tolylamine, butanol, 2-ethyl hexanol, cyclohexanol or ethylene glycol monoethyl ester.

The catalysts (D) used for the long-lasting one-component systems according to the invention may be the usual polyurethane catalysts. Organic lead and/or tin compounds, are used with particularly good effect, optionally in combination with other standard polyurethane catalysts, particularly catalysts containing tertiary amines.

Suitable organotin compounds are tin-(II) salts of carboxylic acids, such as tin acetate, tin octoate, tin-(II) ethylhexanoate and tin laurate; and tin-(IV) compounds, for example, dibutyl tin oxide, dibutyl tin dichloride, dibutyl tin diacetate, dibutyl tin dilaurate or dibutyl tin maleate.

Preferred tin catalysts are sulfur-containing tin compounds such as, for example, di-(octyl)-tin-(IV)-bis-thiomethyl or dimethyl tin-(IV)-bis-thiolauryl, and dimethyl tin bis-thioglycolic acid hexyl ester or dibutyl tin bis-thioglycolic acid octyl ester. The above-mentioned catalysts may of course be used in the form of mixtures, particularly when the low molecular weight chain-extending agents and the relatively high molecular weight polyols both contain primary and secondary OH-groups or when the active hydrogen compounds differ in their reactivity. Also useful are combinations of the organometallic compounds with aminopyridines, hydrazinopyridines (German Auslegeschriften Nos. 2,434,185, 2,601,082 and 2,603,834) or 1,4-diazabicyclo- 2,2,2-octane and/or standard tert.-amine catalysts of the type normally used in polyurethane chemistry.

The lead catalysts are particularly effective when polyether polyols containing secondary hydroxyl groups, for example polypropylene glycols, are used in the system. Where uret dione diisocyanates are used, additional crosslinking can occur through cleavage of the uret dione ring, particularly where lead catalysts are used, although in that case branching allophanate groups or, in the event of complete cleavage of the uret dione ring, additional urethane groups are formed.

By contrast, where polyols essentially containing primary hydroxyl groups are used, the tin compounds, particularly the tin/sulfur catalysts, are particularly effective. In the case of polyethers containing aromatic $NH_2$-groups, there is generally no need at all for catalysis. The catalysts, when used, are used in a quantity of from 0.001 to 5% by weight and preferably in a quantity of from 0.01 to 2% by weight, based on (A)+(B).

The auxiliaries and additives (E) which may optionally be used include dyes or pigments; fillers, such as silica gel, gypsum, talcum, active carbon and metal powders; UV-absorbers or stabilizers, such as phenolic antioxidants; light stabilizers; blowing agents, such as $CO_2$ or fluorodichloroalkanes; surface-active additives, such as emulsifiers or foam stabilizers; cell regulators; antiblocking agents; silicones; flame-proofing agents or fungistatic and/or bacteriostatic substances.

Suitable fillers include, for example, fibrous materials, i.e. any inorganic and/or organic fibrous reinforcing materials known per se, including, for example, glass fibers, preferably in lengths of from 20 to 60 mm; graphite fibers; asbestos fibers; fibrous materials emanating from an organic polymer, for example from a polyester, such as polyethylene terephthalate, or preferably from aromatic polyamides, such as n-phenylene isophthalic acid polyamide, or from poly-p-phenylene terephthalamide or even polycaprolactam. These fibrous materials may even be used in the form of mats, tows, continuous fibers, nonwovens or a random mixture of staple fibers. It is preferred to use glass fibers finished with sizes to provide the fibers with an affinity for polyurethanes. The quantity of filler to be incorporated depends upon the required improvement in the mechanical properties and can generally amount to between 5 and 60% by weight of fibrous material.

The NCO:($NH_2$+OH) equivalent ratio (NCO from stabilized polyisocyanate which will equal the sum of free NCO-groups and NCO-groups reacted with amidine/guanidine and other free polyisocyanate, if used), in the polyurethane-forming reaction amounts to between 0.5:1 and 1.5:1, preferably to between 0.8:1 and 1.5:1 and, more preferably, to between 0.95:1 and 1.2:1.

From 0.3 to 10, preferably from 0.5 to 8 and, more preferably, from 0.75 to 5 equivalents of (OH+$NH_2$)-equivalents of chain-extending agents (C), i.e. low molecular weight polyols or low molecular weight polyamines, per (OH+$NH_2$)-equivalent of relatively high molecular weight polyols and/or polyamines (B) are optionally used in the polyurethane reactive mixtures.

(Dimeric) diisocyanates containing uret dione rings may generally be regarded as diisocyanates so that only the free NCO-groups are taken into consideration. Under certain test conditions (presence of lead catalysts, or relatively high processing temperature, for example 140° C.), however, the uret dione ring enters into the reaction (additional points of attachment via allophanate or biuret groups), so that the latent NCO-groups of the uret dione ring may have to be taken into account in the calculation.

The one-component PU-reactive mixtures obtained may readily be applied by casting or knife coating at room temperature or may even be solid at room temperature and readily fusible, depending upon the viscosity and melting behavior of the starting components. These reactive mixtures are a heterogeneous suspension of the solid, stabilized isocyanates in the polyol and/or polyamine components. The thermal crosslinking of this mixture is generally carried out after the addition of suitable catalysts (D). In the absence of these catalysts, the polyurethane moldings have unsatisfactory properties, particularly where polyols are used as the relatively high molecular weight compounds (B) or chain-extending agents (C). However, there is no need whatever to add catalysts in cases where the aromatic polyamine compounds distinctly are reactive to NCO-groups, are used on their own.

Another feature of the one-component PU-reactive system is that the one-component systems stabilized in accordance with the invention crosslink in a few minutes after reaching a certain temperature (dependent upon the type and quantity of stabilizer used). This means on the one hand that, below that temperature ("thickening temperature"), the desirable, long flow of the as yet uncrosslinked reactive mixtures enables a hot mold to be completely filled, while on the other hand the rapid solidification of the casting mixtures after an increase in temperature provides for rapid mold release cycles. Another advantage of the invention is the very long shelf life of the starting reactive systems, even at relatively high storage temperatures (for example up to 60° C.). The use of the polyisocyanate suspensions according to the invention greatly broadens the potential applications of one-component systems. It is possible to use liquid and not just solidifying polyamine and polyol systems of relatively high molecular weight and also a range of, and not just selected, chain-extending agents (for example high-melting chain-extending agents). An important feature of the one-component systems according to the invention is that aromatic diamines, such as for example 4,4-diaminodiphenylmethane, 2,4-or 2,6-diaminotoluene, 3,5-diethyl-2,4-:-2,6-(65:35)-diaminotoluene, 1,5-diaminonaphthalene or 3,5-diethyl-3',5'-diisopropyl-4,4'-diaminodiphenylmethane, may also be used as chain-extending agents (C) in these systems without losing the character of a one-component system. If, by contrast, these diamines are reacted with NCO-prepolymers in one of the hitherto standard processes, extremely short casting times are obtained, preventing the mixtures from levelling satisfactorily in the mold.

By using relatively high molecular weight polyamines in the one-component system, it is possible to obtain polyurethane (urea)s having distinctly more favorable properties (for example greater strength, higher moduli, greater hardness and higher softening ranges) than with relatively high molecular weight polyols in the PU-reactive mixture alone.

The one-component systems according to the invention are solidified essentially by heat shock. At room temperature or moderately elevated temperature, there is surprisingly no crosslinking reaction, even in the presence of any catalysts, so that even catalyst-containing mixtures will be long-lasting one-component systems.

The processing of the one-component systems according to the invention depends upon their state. Liquid systems pourable at room temperature may be processed by casting. They may have to be briefly heated before processing, for example to 50°–70° C. They may also be processed by centrifugal casting. Hollow bodies may be produced by introducing the reactive mixture into heated molds and distributing it over the surface of the molds by appropriate rotational movements.

Processing may also be carried out by slush molding. In that case, heated molds may be filled with the reaction mixture and, after a certain period of reaction on the heated mold surface, excess, unreacted reaction mixture is poured out of the molds again.

Where blowing agents are used, it is possible to produce cellular polyurethanes optionally having an integral skin structure.

Systems which cannot be poured, but which level, may be applied, for example by knife-coating, to any desired substrates, for example, textile substrates including nonwovens, knitted fabrics and woven fabrics; leather (skiver); matrices (for example velour leather/silicone matrices); or intermediate supports (for example release papers), to form coatings or finishes which are subsequently hardened by heating.

Plastic systems or pastes may be molded under heat and pressure, for periods of only 5 to 15 minutes at 120° C. being sufficient for hardening.

Surface coatings, impression molds or molding may even be produced by the immersion process in which the heated molds to be coated are dipped into the reactive mixture.

The reactive mixture may also be extruded through slots or nozzles into hot media (hot air or hot liquids) and hardened in that way.

The reactive mixtures may be completely or largely reacted in heated extruders to form the polyurethane, extruded in that form through slots or nozzles and, optionally, reacted to completion in hot media. Alternatively, it may be introduced into hot molds and removed therefrom after a short time. The reactive mixture may also be processed by reaction injection molding (RIM).

Solid systems, particularly those based on relatively high melting starting polyols (45° to 65° C.), are processed either under pressure in molds (injection molding) or at or above the melting temperature of the polyol. To this end, the previously prepared one-component systems are introduced in the form of solid granulates into a mold heated to beyond the melting point of the polyol (generally below 70° C.). After the granulates have melted and filled the mold, the mold is heated to 100°–120° C. and its contents solidified.

The solidification temperature of the one-component systems according to the invention depends to a large extent upon the quantity and chemical constitution of the amidine/guanidine derivatives used for stabilizing the polyisocyanates. The solidification time required for forming the polyurethanes decreases with increasing solidification temperature. The heating time may amount to less than 1 minute or even to several hours, depending on the temperature. In some cases, it is of advantage to temper the plastics for a while at 100° C. after removal from the mold in order to ensure complete hardening.

However, the one-component reactive systems may also be hardened by the addition of preferably highly polar solvents, such as dimethyl formamide, N-methyl pyrrolidone, or polar solvents, such as propylene carbonate, dioxane or glycol monomethyl ether acetate, having dielectric constants >5, preferably >12. The stabilizing effect of the stabilizers on the polyisocyanates in the one-component systems may be partly or completely eliminated, depending on the quantity in which these solvents are used. The casting time (pot life) of mixtures such as these may be controlled through the amount of the solvent addition. With small additions, the systems obtained have a pot life of several days at room temperature whereas the systems obtained with larger additions solidify after only 10 to 15 minutes or even suddenly. Once again, the quantity of solvent added depends upon the type and quantity of amidine/guanidine used for stabilization (quality of the polyadduct skin over the isocyanate surface) and is determined for the particular systems by preliminary tests. The technical advantage of reaction mixtures such as these lies in the fact that they solidify in the absence of heat. The thermal solidification time of the one-component systems may of course also be shortened and adequate stability in storage imparted by suitably dosing the solvents.

Solidification of the one-component systems according to the invention may also be brought about by the application of shear forces, for example, in high-speed mixers. The heat effect which occurs with brief stirring generally does not reach the crosslinking-thickening temperature of the one-component systems, so that the polyurea skin on the surface of the isocyanate particles is destroyed solely by mechanical stressing during the mixing process.

Further embodiments of stabilization under various conditions, and, processes for producing and hardening the one-component reactive systems are described in the examples.

PU-reactive systems which, in addition to the deactivated polyisocyanates, contain relatively high molecular weight polyamines (B) and chain-extending agents (C), such as polyols or polyamines (but preferably low molecular weight aromatic polyamines) as components are preferably used. Another preferred reactive system contains relatively high molecular weight polyols (B) and aromatic diamines (C) in addition to the deactivated polyisocyanates. It is possible in this way to produce high-quality elastomers, coatings, cellular elastomers and moldings optionally having a density distribution characterized by a cellular inner core and a more compact outer skin, although the stability of the reactive systems in storage or their reduced reaction velocity enable more favorable procedures to be applied while the catalysts activated after heating provide for rapid hardening to form the polyurethane (urea).

The invention is further illustrated but is not intended to be limited by the following examples in which all parts and percentages are by weight unless otherwise specified.

EXAMPLES

EXAMPLE 1

"Stabilization" of dimeric tolylene-2,4-diisocyanate using substoichiometric quantities of a stabilizer in a suspension in a relatively high molecular weight aromatic amino polyether; determination of the thickening point of the mixtures.

(a) Production of the relatively high molecular weight polyamine 1 mole of a linear polypropylene ether glycol (OH number 56) and 2 moles of tolylene-2,4-diisocyanate are converted into an NCO-prepolymer (3.58% NCO) by heating for 4 hours at 80° C. 810 g of the NCO-prepolymer (heated to 45° C.) are added with intensive stirring to a cooled solution of 52.2 g of potassium hydroxide and 500 ml of water and 300 ml of acetone (NCO:OH$^\ominus$-ratio=1:1.35) at such a rate that an internal temperature of 25° C. is not exceeded. The mixture is then stirred for another 30 minutes at that temperature, followed by heating for 2 hours to reflux temperature. After standing for 30 minutes, the lower aqueous salt solution is separated off from the two-phase reaction mixture and discarded. The upper phase is freed from residues of water and acetone at 20 mbar/80° C. and then at 1 mbar/100° C. By subjecting the product having a temperature of 60° C. to filtration under suction using a pressure filter (3 bars excess pressure), small residues of salt are separated off and the polyether amine (NH number 47.4) isolated.

(b) Polyisocyanate stabilization in accordance with the invention

The quantities of stabilizers indicated below were added to 100 g of the aromatic aminopolyether described above. 17 g of dimeric tolylene-2,4-diisocyanate (24.14% NCO) in the form of a fine powder (10 to 30 μm) were then introduced using a high-speed mixer to form a suspension. The particular reaction mixtures were then heated on a Kofler heating bench. The "thickening temperature" is defined as the temperature at which the reaction mixture begins elastically to crosslink. The crosslinking temperature is dependent inter alia upon the type and quantity of stabilizer and upon the type of polyisocyanate. One-component polyurethane reactive systems based on stabilized polyisocyanates which have a crosslinking temperature above 50° C. are preferred. Lower crosslinking temperatures are indicative of inadequate stabilization of the polyisocyanate.

|  | Amidine/guanidine stabilizer | Quantity of stabilizer (equivalent percent), based on the NCO—equivalents of the dimeric TDI | |
|---|---|---|---|
|  |  | 2.76 eq.-% | 5.52 eq.-% |
| 1. |  | Thickening temperature (crosslinking after a few hours at room temperature) | |
| 2. | 1,2-dimethyltetrahydropyrimidine | 70° | 110° |
| 3. | 1-methyl-2-cyclohexyltetrahydropyrimidine | 65° | 75° |
| 4. | N—(3-dimethylaminopropyl)-2-methyl-tetrahydropyrimidine | 60° | 60° |
| 5. | 1,5-bis-(2-methyltetrahydropyrimidin-1-yl)-3-methyl-3-azapentane | 70° | 95° |
| 6. | diazabicycloundecene | 60° | 70° |
| 7. | diazabicyclononene | 65° | 85° |
| 8. | 1-hydroxyethylimidazoline | 90° | 45° (comparison) |
| 9. | tetramethylguanidine | 50° | 65° |
| 10. | 1,5,7-triaza-7-benzylbicyclo-[4,4,0]-dec-5-ene | 60° | 95° |
| 11. | 1,4,6-triaza-6-N—butylbicyclo-[3,2,0]-oct-4-ene | 75° | 105° |
| 12 | 1,5,7-triaza-7-N—cyclohexylbicyclo-[4,4,0]-dec-5-ene | 110° | 145° |

Storage tests were carried out in polyethylene bottles. The mixtures were regarded as stable when they remained liquid after prolonged storage and also continued to remain heatable (after storage) at 120° C.

EXAMPLE 2

Strengthening of polyisocyanate stabilization by the addition of low molecular weight active hydrogen compounds.

If 0.5 g of water, 1.5 g of ethylene glycol and/or 0.05 g of ethylene diamine are added to a few reaction mixtures corresponding to example 1, the following thickening temperatures are obtained for the stabilizers mentioned (cf. Table). It can clearly be seen that the stabilizing effect is strengthened.

|  |  | Amount of stabilizer added: 2.76 equivalent percent of amidine/guanidine based on dimeric TDI (cf. Example 1) | | | |
|---|---|---|---|---|---|
|  |  | Thickening temperature (°C.) after the addition of | | | |
|  | Amidine/guanidine stabilizer | (cf. Example 1) no further additions | 0.5 g of water | 1.5 g of ethylene glycol | 0.05 g of ethylene diamine |
| 1. | 1,2-dimethyltetrahydropyrimidine | 70° | 92 | 115 | 135 |
| 2. | 1-methyl-2-cyclohexyltetrahydropyrimidine | 65° | 70 | 105 | 140 |
| 3. | N—(3-dimethylaminopropyl)-2-methyltetrahydropyrimidine | 60° | 75 | 115 | 135 |
| 4. | 1,5-bis-(2-methyltetrahydropyrimidin-1-yl)-3-methyl-3-azapentane | 70° | 105 | 130 | 145 |
| 5. | diazabicycloundecene | 60° | 70 | 120 | 135 |
| 6. | diazabicyclononene | 65° | 75 | 125 | 135 |

EXAMPLE 3

Polyurethane elastomers/in situ stabilization

Stablizers 1 to 6 are dissolved in the quantities indicated in 100 g of the linear aminopolyether mentioned in example 1 (NH number 47), followed by the addition of 26.4 g of finely ground dimeric tolylene diisocyanate (TT). The mixture is then mixed with 15.0 g of a 3,5-diethyl-2,4/2,6-diaminotoluene isomer mixture. For further treatment, the reaction mixtures, which are now stable in storage at room temperature, are first degassed at room temperature or slightly elevated temperature (30° to 40° C.), poured into a cold or preheated mold and then heated at 120° C. After a solidification time of 30 mins. to 1 hour, polyurethane elastomers having the mechanical properties noted in the following Table are removed from the molds (cf. Table):

The following stabilizers were used:
1. 1,2-dimethyltetrahydropyrimidine
2. 1-methyl-2-cyclohexyltetrahydropyrimidine
3. N-(3-dimethylaminopropyl)-2-methyltetrahydropyrimidine
4. diazabicycloundecene
5. diazabicyclononene
6. tetramethyl guanidine

| Stabilizer No. | 1 | 2 | 3 | 4 | 5 | 6 |
|---|---|---|---|---|---|---|
| Quantity (g) | 65 | 60 | 90 | 60 | 60 | 50 |
| Thickening temperature (°C.) | 65 | 60 | 90 | 60 | 60 | 50 |
| Tensile strength (MPa) | 13.8 | 8.9 | 11.3 | 9.3 | 22.5 | 5.5 |
| Breaking elongation (%) | 320 | 150 | 210 | 150 | 350 | 75 |
| Tear propagation resistance (N/cm) | 480 | 370 | 400 | 320 | 490 | 100 |
| Elasticity (%) | 40 | 38 | 38 | 36 | 40 | 32 |
| Hardness (Shore A) | 94 | 96 | 96 | 94 | 97 | 91 |
| Hardness (Shore D) | 48 | 49 | 48 | 43 | 53 | 40 |

EXAMPLE 4 (External Stabilization)

50 g of finely powdered dimeric TDI are added to a solution of 1.0 g of 1,2-dimethyltetrahydropyrimidine in 100 ml of petroleum ether. The suspension is stirred for about 1 hour at room temperature. After filtration under suction, the filter cake is washed again with petroleum ether. After drying, 16 g of the deactivated polyisocyanate are stirred with 100 g of the aminopolyether described in example 1. The reaction mixture remains stable in storage at room temperature and shows a thickening temperature of 60° C. on a Kofler bench. After the mixture has been heated for 30 minutes at 120° C., a highly elastic plastic having a hardness of approximately 90 Shore A is obtained.

EXAMPLE 5 (External Stabilization)

If the dimeric TDI mentioned in example 4 is replaced by 50 g of 4,4'-dimethyl-3,3'-diisocyanatodiphenylurea (TDI-urea diisocyanate-TDIH), a deactivated polyisocyanate is obtained as in example 4 and is mixed with 100 g of aminopolyether (ratio 100:16). This mixture also remains stable for several months at room temperature, whereas at 120° C. it crosslinks in a short time to form a highly elastic plastic. The liquid, readily pourable mixture has a thickening temperature of 80° C.

EXAMPLE 6 (Comparison)

(Effect of the stabilizers on uret dione diisocyanate)

A suspension of 6 g of dimeric TDI in 60 ml of toluene is mixed with 0.05 g of 1,2-dimethyltetrahydropyrimidine and the resulting mixture heated with stirring to 70°–80° C. After about 15 to 30 minutes, a solution has formed. After removal of the toluene by distillation in vacuo, a liquid residue having an NCO content of 45.2% is obtained. It could also be recognized as monomeric TDI in an IR-spectrum. This shows that the TDI is dissociated at elevated temperatures through the presence of the catalysts without any surface deactivation of the solid diisocyanate.

EXAMPLE 7 (Comparison)

(Effect of stabilizer on urea diisocyanates)

A mixture of 6 g of 4,4'-dimethyl-3,3'-diisocyanatodiphenylurea and 60 ml of dichlorobenzene is heated to 60°–70° C. 0.05 g of 1,2-dimethyltetrahydropyrimidine is then added to the now almost clear solution. A white deposit is immediately precipitated. After filtration under suction and washing with petroleum ether, a white powder of low NCO-content (8–10%) is obtained. The IR-spectrum shows that biuretization (reaction of the NCO-groups with the urea groups) has taken place (biuret bands at 1720 and 1675 cm$^{-1}$).

EXAMPLE 8

(a) 26.4 g of dimeric TDI are stirred into a mixture of 100 g of the aminopolyether described in example 1 and 15 g of 3,5-diethyl-2,4-diaminotoluene. After rapid degassing in vacuo, the reaction mixture is poured into a mold and heated for 1 hour at 120° C. The polyurethane material obtained is rigid, but still fragile and breaks under tensile stress. This had been expected because the index (ratio of moles of NCO in the dimeric TDI to moles of NH$_2$) only amounts to about 0.6 so that there is no NCO/NH$_2$ equivalence to form a polymer. In addition, this reaction mixture is not stable in storage at room temperature and undergoes a continuous increase in viscosity. The mixture begins to solidify after a short time, even at room temperature.

(b) If, by contrast, 0.3 g of 1,2-dimethyltetrahydropyrimidine is stirred in before addition of the dimeric TDI, the reaction mixture remains stable in storage at room temperature (thickening temperature: 90° C.). Thermal solidification at 120° C. gives a rigid, elastic polyurethane material having the following mechanical properties:

Tensile strength (MPa): 18.5
Breaking elongation (%): 250
Tear propagation resistance (N/cm): 510
Elasticity (%): 40
Hardness (Shore D): 55

The index now amounts to 1.2 because, through the catalytic effect of the amidine, it is not the dimeric TDI but instead the monomeric TDI with twice the NCO-content which reacts.

EXAMPLE 9

Catalytic effect of stabilizers on polyether/NCO reactions (a) 34.8 g of dimeric TDI stirred into a solution of 8.9 g of 3,5-diethyl-2,4-diaminotoluene in 100 g of a linear polypropylene diether diol (molecular weight 2000, OH number 56) and the resulting mixture heated to 120° C. A polyurethane material which has not fully reacted and cannot be cracked is obtained after about 1 hour, breaking under compressive stress. The starting mixture is not stable in storage at room temperature. It begins to thicken into a viscous paste after only a short time (preliminary reaction of dimeric TDI with the aromatic diamine).

(b) Process according to the invention:

If 0.15 g of 1,2-dimethyltetrahydropyrimidine is added to the above reaction mixture before the dimeric TDI, the mixture remains stable in storage at room temperature (thickening temperature 60°) and a fully reacted, highly elastic polyurethane material (co-reaction of the relatively high molecular weight polypropylene ether diol) is obtained after heating for 1 hour at 120° C.

EXAMPLE 10

Effects of the stabilizers on catalyses in NCO/OH and NCO/NH$_2$-reactions as known from the literature:

8 g of 2,4-diisocyanatotoluene and 11.5 g of molten 4,4'-diisocyanatodiphenylmethane are stirred into 100 g of the linear aminopolyether mentioned in example 1.

In another series of tests, 0.1 g of the amidine, 1,2-dimethyltetrahydropyrimidine, described in the literature as a polyurethane catalyst is added to the two mixtures.

Finally, 16 g of the solid polyisocyanate (4,4'-dimethyl-3,3'-diisocyanatodiphenylurea) are used as the said isocyanate component with and without stabilizers. The following Table illustrates the effect of the stabilizer upon the NCO/NH$_2$-reaction:

| Isocyanate | stabilizer (g) | Viscosity (mPa · s/25° C.) 5 mins. | 10 mins. | Solidification time/mins. |
|---|---|---|---|---|
| \multicolumn{5}{c}{not stable in storage at room temperature (comparison)} | | | | |
| 1. 2,4-diisocyanatotoluene | — | 48,000 | 105,000 | crosslinking after 30 mins. |
| 2. 2,4-diisocyanatotoluene | 0.1 | 60,000 | 250,000 | crosslinking after 15 mins. |
| 3. 4,4'-diisocyanatodiphenylmethane | — | | | crosslinking after 7 mins. |
| 4. 4,4'-diisocyanatodiphenyl- | 0.1 | | | crosslinking after 3 mins. |
| 5. TDI—urea diisocyanate | — | | | continuous increase in viscosity, crosslinking after a few hours |
| \multicolumn{5}{c}{stable in storage at room temperature} | | | | |
| 6. TDI—urea diisocyanate | 0.1 | thickening temperature | | 70° C. |
| 7. TDI—urea diisocyanate | 0.2 | | | 80° C. |
| 8. TDI—urea diisocyanate | 0.3 | | | 95° |

As known from the literature, addition of the amidine/guanidine has a distinct catalytic effect upon the NCO/NH$_2$-reaction in the case of TDI and MDI (acceleration of reaction/crosslinking). The reaction of the aminopolyether with the solid polyisocyanate produces a completely different picture. In that case, very small amounts of the stabilizer are sufficient to keep the reaction mixture stable in storage at room temperature and hence to suppress almost completely the NCO/NH$_2$-reaction at room temperature. In contrast to normal catalyst effects, an increased stabilizer dosage leads to additional stabilization of the polyisocyanate, as can be seen from the increase in the thickening temperature.

Example 11

(Polyurethane elastomer, TDI-urea diisocyanate)

1.5 g of 1-methyl-2-cyclohexyltetrahydropyrimidine are added to 500 g of the linear aminopolyether mentioned in Example 1. 90 g of finely powdered (particle size 10-3- μm) 4,4'-dimethyl-3,3'-diisocyanatodiphenyl urea (TDIH) are then introduced. A suspension of the stabilized polyisocyanate which is stable in storage at room temperature is obtained (thickening temperature of the mixture 75° C.). After the mixture has been heated at 120° C. (30–60 minutes) and subsequently tempered for 1 hour, an elastic material having the following properties is obtained:
Tensile strength (MPa): 15.2
Breaking elongation (%): 380
Tear propagation resistance (N/cm): 415
Elasticity (%): 40
Hardness (Shore A): 80

With a heating temperature of 150° to 170° C., the moldings may be removed from their molds after much shorter solidification times. With a layer thickness of from about 1 to 1.5 cm, mold release is possible after only 2 to 3 minutes.

Example 12

0.5 g of 1,2-dimethyltetrahydropyrimidine is added to a solution of 100 g of a trifunctional polyoxypropylene-polyoxyethylene ether polyol (ratio of the oxypropylene/oxyethylene components 80:20; OH number 28, molecular weight 6000) and 25 g of 3,5-diethyl-2, 4-diaminotoluene. 30 g of finely powdered dimeric TDI are then added. The reaction mixture is stable in storage at room temperature and shows a thickening temperature of 70° C. After heating for 30 to 60 minutes at 120° C., rigid, tough/elastic moldings having the properties in column I in the following Table are obtained.

If 0.1 g of dibutyl tin (IV) dilaurate is added to the above mixture, the fully heated test specimens show greatly improved breaking elongation and, to a lesser extent, improved tensile strength (cf. column II).

| | I | II |
|---|---|---|
| Tensile strength (MPa): | 12.5 | 15.5 |
| Breaking elongation (%) | 320 | 425 |
| Tear propagation resistance (N/cm): | 420 | 410 |
| Elasticity (%): | 40 | 40 |
| Hardness (Shore D): | 47 | 48 |

Example 13

Stabilization with a salt (a) A mixture of 6 g of acetic acid and 20 g of diethyl ether is added dropwise to a solution of 11.2 g of 1,2-dimethyltetrahydropyrimidine in 60 ml of diethyl ether. The acetic acid amidine salt precipitates in the form of a solid, finely crystalline deposit which, after washing with ether, has a melting point of 55°–60° C.

(b) 100 g of the aminopolyether described in Example 1 are added to 0.15 g of this amidine salt, after which 16 g of dimeric TDI are stirred in. The mixture is stable in storage at room temperature and has a thickening temperature of 75° to 80° C. After brief heating at 120° C., an elastic polyurethane having a Shore A hardness of 90 is obtained.

(c) If 0.15 g of the amidine salt is added to a solution of 100 g of a linear polypropylene ether diol having a molecular weight of 2000 and 8.9 g of 3,5-diethyl-2,5-diaminotoluene, a reaction mixture having a thickening temperature of only 40°-50° C. is obtained after the addition of 34.8 g of dimeric TDI. This mixture is not indefinitely stable in storage at room temperature. It undergoes a gradual increase in viscosity into a paste. Thermal crosslinking at 120° C. produces a brittle polyurethane material and it is only after the addition of 0.1 g of dibutyl tin-(IV) dilaurate to the reaction mixture, followed by heating to 120° C., that an elastic molding is obtained. This shows that the amidine salt (in contrast to the free amidine) does not adequately stabilize the polyisocyanate and develops inadequate catalytic activity during heating with the polyether polyol.

Example 14

Amidine/salt (a) The amidine salt of diazabicyclononene and formic acid produced by the process according to Example 13a melts at 60°-65° C.

(b) The mixture containing 0.3 g of the amidine/formic acid salt 14a prepared in accordance with Example 13b is stable in storage and has a thickening temperature of 80° C. An elastic molding is obtained by hardening at a crosslinking temperature of 120° C.

(c) The mixture containing 0.3 g of the amidine/formic acid salt 14a prepared in accordance with Example 13c is also not indefinitely stable in storage at room temperature (thickening temperature 40°-50° C.). In this case, too, satisfactory hardening to form an elastomer can only be obtained by the addition of 0.1 g of dibutyl tin (IV) dilaurate.

Example 15

0.3 g of dimethyltetrahydropyrimidine and 0.1 g of ethylene diamine are added to 200 g of a polyester of adipic acid and ethylene glycol (molecular weight 2000) melted at 50°-60° C. Thereafter, 64 g of TDIH (Example 11) in the form of a fine powder and then 17.8 g of 3,5-diethyl-2,4-diaminotoluene are stirred in. After brief degassing, the melt is poured into a mold which is heated at 120° C. After a solidification time of approximately 15 minutes, followed by tempering of the molding for about 1 to 2 hours at 120° C., an elastic material having the following mechanical properties is obtained:

Tensile strength (MPa): 35.8
Breaking elongation (%): 570
Tear propagation resistance (N/m): 630
Elasticity (%): 45
Hardness (Shore A): 92

If the melt is not heated to form the polyurethane, but instead is left to cool again at around 50° C., a storable one-component mixture is obtained in the form of a solid granulate.

These systems may be introduced after any length of time into a mold heated to approximately 70°-100° C. After melting (60°-80° C.), the now thinflowing melt is distributed around the mold, its flow characteristic being determined by the temperature of the mold. Final hardening takes place at a temperature of 110° to 120° C.

Accordingly, these one-component systems may be processed by casting providing the processing temperature is above the melting temperature of the polyester.

To this end, the storable reaction mixture is best melted (50°-70° C.) before processing, degassed, subsequently poured into the desired preheated molds with the molds heated at 110° to 120° C. After a solidification time of a few minutes and tempering for 30 to 60 minutes, the highly elastic elastomers can be removed from the molds.

Example 16

0.25 g of diazabicyclononene and 0.075 g of ethylene diamine are added at approximately 50° C. to 200 g of a linear polyester of adipic acid and 1,4-butane diol containing approximately 1% of water. 40 g of dimeric TDI and 17.8 g of 3,5-diethyl-2,5-diaminotoluene are then added in that order. The reaction mixture has a thickening temperature of approximately 115° C. and, accordingly, is stable in storage at room temperature or moderately elevated temperatures. After solidification of the reactive mixture at 120° to 130° C., a fine-cell, tough-elastic foam having a unit weight of approximately 400 g/l is obtained in a short time.

Example 17

0.15 g of 1,2-dimethyltetrahydropyrimidine is added to a mixture of 100 g of a long-chain aromatic polyether diamine according to Example 1 and 0.6 g of a polyether siloxane block copolymer. 17 g of TDIH are then stirred in using a high-speed stirrer. A storable suspension is obtained. A vigorous stream of air is then passed through this suspension for 2.5 hours to obtain a creamy mixture. 590 g of the creamy mixture are introduced from below in about 2 seconds without any further stirring into a vertically arranged panel mold heated to 130° C. (dimensions of molding 20×39.4×1 cm). After 5 minutes, a molding having a surface hardness of 70 Shore A (at 25° C.), a density of 0.75 g/cc and an integral density distribution (compact surface, cellular core) is removed from the mold. The surface of the molding is fault-free.

Example 18

100 g of a linear polyoxypropylene diol containing 20% of terminal oxyethylene groups (OH number 56, molecular weight 2000) are mixed with 0.25 g of diazabicyclononene and 25 g of dimeric diphenylmethane-4,4'-diisocyanate. The polyurethane obtained from the storable reaction mixture by thermal solidification shows the following mechanical properties (in this case, the properties of the elastomer are relatively poor due to the absence of a chain-extending agent):

Tensile strength (MPa): 3.0
Breaking elongation (%): 120
Tear propagation resistance (N/cm): 20
Elasticity (%): 64
Hardness (Shore A): 58

The dimeric isocyanate is prepared as follows:

0.25 g of tributyl phosphine is added with stirring to a solution of 100 g of diphenylmethane-4, 4'-diisocyanate in 100 g of toluene and 100 g of petroleum ether. The dimer precipitated is stirred for another 2 hours, filtered off under suction, and after washing with petroleum ether, is dried in vacuo at room temperature in the absence of moisture. The dimer is obtained in a yield of more than 95% and is substantially free from oligomers (cf. European Pat. No. 0,071,899).

Example 19

0.15 g of 1,2-dimethyltetrahydropyrimidine and then 20 g of dimeric TDI and 10 g of 3,5-diethyl-2,4-diaminotoluene are added to 100 g of a linear polyoxypropylene diamine having a molecular weight of 3400 (produced from polyoxypropylene diol with ammonia in accordance with U.S. Pat. No. 3,654,370). The reaction mixture which is stable in storage at room temperature has a thickening temperature of 95° C. After solidification for 30–60 minutes at 130°–140° C., a high-melting, highly elastic molding having a shore A hardness of approximately 80 and favorable mechanical properties is obtained.

Example 20

100 g of an aromatic aminopolyether based on a polyoxypropylene ether diol (molecular weight 2000) and tolylene diisocyanate (molar ratio 1:2) produced in accordance with German Offenlegungsschrift No. 2,948,419 (amine number 46.7, molecular weight 2350) were mixed with (a) 0.2 g of 1,4,6-triaza-6-N-butyl-bicyclo-[3,3,0]oct-4-ene,
(b) 0.2 g of 1,5,7-triaza-7-N-benzylbicyclo-[4,4,0]dec-5-ene,
(c) 0.2 g of 1,5,7-triaza-7-N-cyclohexylbicyclo[4,4,0]-dec-5-ene, and then with 18.0 g of 3,3'-diisocyanato-4,4'-dimethyl diphenylurea in the form of a fine powder. These reaction mixtures are indefinitely stable in storage at room temperature and do not undergo any increase in viscosity. After brief degassing in vacuo and heating (30–60 mins/120° C.), elastic moldings having the following mechanical properties are obtained:

| Example | 2a | 2b | 2c |
| --- | --- | --- | --- |
| Shore hardness A | 93 | 88 | 90 |
| Tensile strength [Mpa] | 12.5 | 13.8 | 15.7 |
| Breaking elongation [%] | 205 | 320 | 480 |
| Tear propagation resistance [N/cm] | 23.5 | 21.5 | 25.7 |
| Elasticity [%] | 43 | 40 | 40 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of solid polyisocyanates stabilized by surface modification and exhibiting retarded reactivity comprising reacting:
(a) a solid, finely divided polyisocyanate having a melting point above 30° C.,
(b) from 0.1 to 25 equivalent percent of amidine/guanidine groups per isocyanate equivalent of an acyclic, monocyclic or bicyclic compound which contains one or more amidine groups of the formula

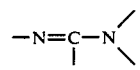

and/or one or more guanidine groups of the formula

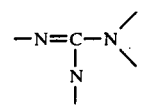

provided that said compound does not contain any hydrogen atoms reactive with an isocyanate group at room temperature, and
(c) from 0 to 50 equivalent percent of amine per amidine/guanidine equivalent of a compound having a molecular weight of from 32 to 6000 and being selected from the group consisting of
  (i) di- or higher functional organic compounds containing two or more aliphatically-bound primary and/or secondary amino groups,
  (ii) organic compounds containing one or more terminal $-CO-NH-NH_2$ groups,
  (iii) hydrazine and
  (iv) mixtures thereof, said reaction being conducted at a temperature below the melting temperature of said polyisocyanate (a) and being conducted in the presence of
(d) a liquid medium selected from the group consisting of
  (i) organic compounds containing one or more hydroxy groups and having molecular weights of from 62 to 6000,
  (ii) organic compounds containing two or more aromatically-bound amino groups and having molecular weights of from 108 to 6000,
  (iii) organic compounds containing two or more aliphatically-bound amino groups and having molecular weights of from 400 to 6000,
  (iv) plasticizers,
  (v) water,
  (vi) mixtures thereof, and
  (vii) mixtures of any one or more of (d)(i) through (d)(vi) with an apolar or slightly polar solvent,
to form a suspension of stabilized polyisocyanate in the liquid medium.

2. The process of claim 1 wherein the particle size of said solid polyisocyanate (a) is from 0.5 to 200 μm.

3. The process of claim 2 wherein the particle size of said polyisocyanate (a) is from 1 to 50 μm.

4. The process of claim 1 wherein said solid polyisocyanate (a) has a melting point above 80° C.

5. The process of claim 4, wherein said solid polyisocyanate (a) has a melting point above 130° C.

6. The process of claim 1 wherein said liquid medium is selected from the group consisting of
  (i) organic compounds containing two or more hydroxyl groups and having molecular weights of from 400 to 6000,
  (ii) organic compounds containing two or more aromatically-bound amino groups and having molecular weights of from 400 to 6000, and
  (iii) mixtures thereof.

7. The process of claim 6 wherein said liquid medium contains, in addition to (i), (ii), or (iii),
  (iv) organic compounds containing two or more hydroxy groups and having molecular weights of from 60 to 399, and/or (v) organic compounds containing two or more aromatically-bound amino groups and having molecular weights of from 108 to 399.

8. The process of claim 1, wherein said liquid medium is (d)(vii).

9. The process of claim 8, wherein said solvent is selected from the group consisting of aliphatic hydrocarbons, cycloaliphatic hydrocarbons, aromatic hydrocarbons, halogenated hydrocarbons, ethers, ketones, and esters.

10. The process of claim 1, wherein said reaction is conducted at a temperature of up to about 70° C.

11. The process of claim 10, wherein said reaction is conducted at a temperature of from 0° to 50° C.

12. The process of claim 1 wherein said liquid medium is selected from the group consisting of
(i) organic compounds containing one hydroxyl group and having molecular weights of from 400 to 6000,
(ii) plasticizers,
(iii) water,
(iv) mixtures thereof, and
(v) mixtures of any one of (i), (ii), (iii) and (iv) with an apolar or slightly polar solvent.

13. The process of claim 12 wherein said stabilized polyisocyanate is isolated from said liquid medium.

14. The process of claim 13 further comprising the step of suspending the stabilized polyisocyanate in a compound selected from the group consisting of
(i) organic compounds containing two or more hydroxyl groups and having molecular weights of from 400 to 6000,
(ii) organic compounds containing two or more aromatically and/or aliphatically bound amino groups and having molecular weights of from 400 to 6000, and
(iii) mixtures thereof.

15. The process of claim 1, wherein said liquid medium is an organic compound containing two or more aromatically bound amino groups and having a molecular weight of from 400 to 6000.

16. The process of claim 1 characterized in that the components are reacted in quantities corresponding to a formulation for the production of a one-component polyurethane system.

17. The process of claim 1 wherein the compound (b) is an acyclic, monocyclic or bicyclic amidine of the formula:

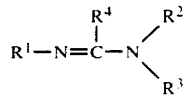

wherein
R$^1$ and R$^4$, which may be the same or different, represent a radical selected from the group consisting of a hydrogen radical; a C$_1$ to C$_{18}$ straight-chain or branched aliphatic hydrocarbon radical, a C$_5$ to C$_7$ cycloaliphatic hydrocarbon radical, an araliphatic radical or an aromatic radical, R$^2$ and R$^3$, which may be the same or different, represent a radical selected from the group consisting of a C$_1$ to C$_{18}$ straight-chain or branched aliphatic hydrocarbon radical, a C$_5$ to C$_7$ cycloaliphatic hydrocarbon radical, an araliphatic radical, an aromatic radical, an alkylene-N-di-(cycloalkyl) radical, or an alkylene-N-di(alkyl) radical and wherein any group of two of the radicals R$^1$ through R$^4$ may be attached to each other to form a ring.

18. The process of claim 17 wherein any one or more of R$^1$ through R$^4$ contain substituents inert under the reaction conditions.

19. The process of claim 17 wherein any one or more of R$^1$ through R$^4$ are interrupted by one of the following units —O—, —S—, -N-alkyl or -N-cycloalkyl.

20. The process of claim 17 wherein R$^1$ and/or R$^4$ represents a C$_1$ to C$_4$ straight chain alkyl or branched alkyl radical.

21. The process of claim 17 wherein R$^2$ and/or R$^3$ represent a —(CH$_2$)$_n$—N—(C$_1$-C$_6$-alkyl)$_2$ radical.

22. The process of claim 17 wherein said compound (b) is monocyclic or bicyclic.

23. The process of claim 17 wherein said compound (b) is a cyclic amidine of the formula

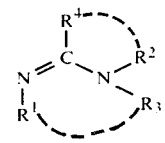

wherein the radicals R$^1$ and R$^3$ and/or the radicals R$^2$ and R$^4$ together represent a straight chain or branched C$_2$ to C$_5$ alkylene radical.

24. The process of claim 23, wherein said alkylene radical contains one or more of the following heteroatoms —O—, —S—, or

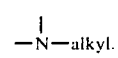

25. The process of claim 23 wherein said alkylene radical is selected from the group consisting of —(CH$_2$)$_2$— and —(CH$_2$)$_3$—.

26. The process of claim 17 wherein said compound (b) is a cyclic amidine of the formula

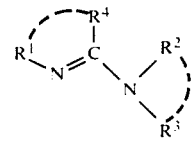

wherein the radicals R$^1$ and R$^4$ and/or the radicals R$^2$ and R$^3$ together represent a straight chain or branched C$_2$ to C$_5$ alkylene radical.

27. The process of claim 26, wherein said alkylene radical contains one or more of the following heteroatoms —O—, —S—, or

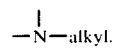

28. The process of claim 26 wherein said alkylene radical is selected from the group consisting of —(CH$_2$)$_2$— and —(CH$_2$)$_3$—.

29. The process of claim 1 wherein the compound (b) is a cyclic amidine of the formula

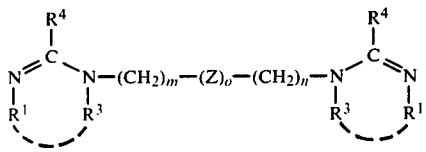

wherein
$R^1$ and $R^3$ together represents a straight-chain or branched chain $C_2$ to $C_5$ alkylene radical, Z represents a radical selected from the group consisting of

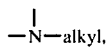

$C_2$ to $C_{14}$ straight chain or branched alkylene, $C_5$ to $C_8$ cycloalkylene and, dicyclohexyl-($C_1$ to $C_4$ alkylene), m and n, which may be the same or different, represent integers of from 2 to 10, and o represents 0 or 1, and $R^4$ is selected from the group consisting of a hydrogen radical: a $C_1$ to $C_{18}$ straight-chain or branched aliphatic hydrocarbon radical, a $C_5$ to $C_7$ cycloaliphatic hydrocarbon radical, an araliphatic radical or an aromatic radical.

30. The process of claim 29 wherein Z represents a straight chain or branched $C_2$ to $C_{14}$ alkylene radical which is interrupted in the chain with —O—.

31. The process of claim 29 wherein m and n represent 2 or 3.

32. The process of claim 1 wherein the compound (b) is a cyclic amidine of the formula

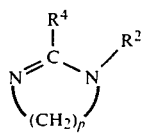

wherein
p is an integer of from 2 to 4,
$R^4$ represents a straight-chain or branched $C_1$ to $C_4$ alkyl, and
$R^2$ represents a straight-chain or branched $C_1$ to $C_4$ alkyl, a —$(CH_2)_p$—N—$(R^4)_2$ or a $C_5$ to $C_7$ cycloalkyl radical.

33. The process of claim 1 wherein the compound (b) is an acyclic, monocyclic or bicyclic guanidine of the formula:

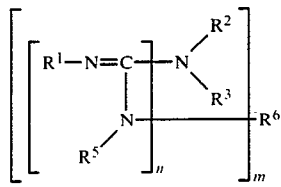

wherein
m = 1, 2,
n = 1, 2, or 3 when m = 1 and n = 1, whem m = 2,
$R^1$ represents a radical selected from the group consisting of a hydrogen radical; a $C_1$ to $C_{18}$ straight-chain or branched aliphatic hydrocarbon radical, a $C_5$ to $C_7$ cycloaliphatic hydrocarbon radical, an araliphatic radical or an aromatic radical, $R^2$, $R^3$ and $R^5$ which may be the same or different represents a radical selected from the group consisting of a $C_1$ to $C_{18}$ straight-chain or branched aliphatic hydrocarbon, a $C_5$ to $C_7$ cycloaliphatic hydrocarbon radical, an araliphatic radical, an aromatic radical, an alkylene-N-di(cycloalkyl) radical, or an alkylene-N-di(alkyl) radical, $R^6$ represents either a monofunctional radical of the type mentioned for $R^2$ or a difunctional alkylene radical which can be interrupted by —O—,

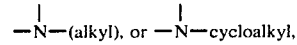

and
wherein when n = 1, any group of two of the radicals $R^1$, $R^2$, $R^3$, $R^5$ and $R^6$ may be attached to each other to form a ring.

34. The process of claim 33 wherein said component (b) is a cyclic guanidine of the formula

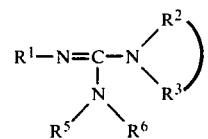

35. The process of claim 33 wherein said component (b) is a cyclic guanidine of the formula

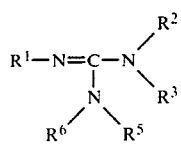

36. The process of claim 33 wherein said component (b) is a cyclic guanidine of the formula

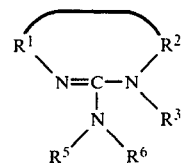

37. The process of claim 33 wherein said component (b) is a cyclic guanidine of the formula

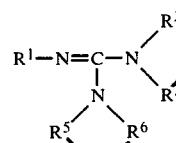

38. The process of claim 33 wherein said component (b) is a cyclic guanidine of the formula:

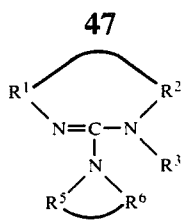

39. The process of claim 33 wherein said component (b) is a cyclic guanidine of the formula

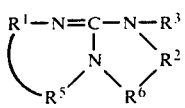

40. The process of claim 33 wherein any one or more of $R^1$, $R^2$, $R^3$, $R^5$ and $R^6$ is substituted with one or more radicals which are inert during the reaction.

41. Surface-modified, stabilized, solid, finely divided polyisocyanates having retarded reactivity produced by the process of claim 1, having a residual NCO-content of from at least 75% to less than 99.9% of the NCO-groups originally present in the starting polyisocyanates and having a thickening temperature of the suspension above 60° C.

42. The polyisocyanate of claim 41 having a residual NCO-content of from 92 to 99.7%.

43. The polyisocyanate of claim 42 having a residual NCO-content of from 97 to 99.7%.

44. The polyisocyanate of claim 41 having a thickening temperature from 80° to 140° C.

45. The polyisocyanate of claim 44 having a thickening temperature of from 90° to 135° C.

46. Surface-modified, stabilized, solid, finely divided polyisocyanates having retarded reactivity produced by the process of claim 6, having a residual NCO-content of from at least 75% to less than 99.9% of the NCO-groups originally present in the starting polyisocyanates and having a thickening temperature of the suspension above 60° C.

47. Surface-modified, stabilized, solid, finely divided polyisocyanates having retarded reactivity produced by the process of claim 7, having a residual NCO-content of from at least 75% to less than 99.9% of the NCO-groups originally present in the starting polyisocyanates and having a thickening temperature of the suspension above 60° C.

48. Surface-modified, stabilized, solid, finely divided polyisocyanates having retarded reactivity produced by the process of claim 15, having a residual NCO-content of from at least 75% to less than 99.9% of the NCO-groups originally present in the starting polyisocyanates and having a thickening temperature of the suspension above 60° C.

49. In the process of producing polyurethanes from
(A) polyisocyanates,
(B) relatively high molecular weight polyhydroxyl and/or polyamino compounds,
(C) optionally, low molecular weight chain-extending agents,
(D) optionally, catalysts and,
(E) optionally, other auxiliaries and additives, the improvement wherein said components A and B are supplied in the form of a suspension produced in accordance with claim 1.

50. A process for the production of solid polyisocyanates stabilized by surface modification and exhibiting retarded reactivity comprising
(A) reacting:
  (a) a solid, finely divided polyisocyanate having a melting point above 30° C.,
  (b) from 0.1 to 25 equivalent percent of amidine/guanidine groups per isocyanate equivalent of an acyclic, monocyclic or bicyclic compound which contains one or more amidine groups of the formula —N=C—N< and/or one or more guanidine groups of the formula

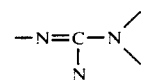

provided that said compound does not contain any hydrogen atoms reactive with an isocyanate group at room temperature, and
  (c) from 0 to 50 equivalent percent of amine per amidine/guanidine equivalent of a compound having a molecular weight of from 32 to 6000 and being selected from the group consisting of
    (i) di- or higher functional organic compounds containing two or more aliphatically-bound primary and/or secondary amino groups,
    (ii) organic compounds containing one or more terminal —CO—NH—NH$_2$ groups.
    (iii) hydrazine, and
    (iv) mixtures thereof,
said reaction being conducted at a temperature below the melting temperature of said polyisocyanate (a) and being conducted in the presence of
  (d) an apolar or slightly polar solvent,
(B) isolating said stabilized polyisocyanate from said solvent, and
(C) suspending the stabilized polyisocyanate in a component selected from the group consisting of
  (i) organic compounds containing two or more hydroxyl groups and having molecular weights of from 400 to 6000,
  (ii) organic compounds containing two or more aromatically and/or aliphatically bound amino groups and having molecular weights of from 400 to 6000, and
  (iii) mixtures thereof.

* * * * *